(12) United States Patent
Vandeven et al.

(10) Patent No.: US 11,375,654 B2
(45) Date of Patent: Jul. 5, 2022

(54) METHOD AND APPARATUS FOR ADJUSTING A HARVESTING HEADER FLOAT SYSTEM BASED ON MACHINE PITCH OR TERRAIN AND SYSTEM THEREOF

(71) Applicant: DEERE & COMPANY, Moline, IL (US)

(72) Inventors: Michael Vandeven, Princeton, IA (US); Bryan Yanke, Eldridge, IA (US); Duane Bomleny, Geneseo, IL (US); Alex Brimeyer, Bettendorf, IA (US); Joshua R. Pierson, Bettendorf, IA (US); Bruce A. Coers, Hillsdale, IL (US); Brian J. Gilmore, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 324 days.

(21) Appl. No.: 16/595,785

(22) Filed: Oct. 8, 2019

(65) Prior Publication Data
US 2021/0100155 A1    Apr. 8, 2021

(51) Int. Cl.
*A01B 63/00* (2006.01)
*A01D 47/00* (2006.01)
*A01B 63/111* (2006.01)
*A01D 45/02* (2006.01)

(52) U.S. Cl.
CPC ............ *A01B 63/008* (2013.01); *A01D 47/00* (2013.01); *A01B 63/1112* (2013.01); *A01D 45/021* (2013.01)

(58) Field of Classification Search
CPC . A01B 63/008; A01B 63/1112; A01B 63/111; A01D 47/00; A01D 45/021; A01D 75/287; A01D 41/141; A01D 41/145
See application file for complete search history.

(56) References Cited

U.S. PATENT DOCUMENTS

| | | | | |
|---|---|---|---|---|
| 4,612,757 A | * | 9/1986 | Halls | A01D 75/287 56/10.2 E |
| 5,155,984 A | * | 10/1992 | Sheehan | A01D 41/141 56/10.2 E |
| 5,471,823 A | | 12/1995 | Panoushek et al. | |
| 5,524,424 A | * | 6/1996 | Halgrimson | A01D 41/127 56/10.2 A |

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A harvesting header for traversing a field to perform a harvesting operation includes a first frame assembly adapted to be coupled to a work machine and a second frame assembly suspended forward of the first frame assembly. The second frame assembly may pivot relative to the first frame assembly. A suspension system is coupled to the second frame assembly and provides a suspension force to the second frame assembly. A controller is operably coupled to the suspension system, and a slope detection system is disposed in electrical communication with the controller for communicating a slope of the field to the controller during the harvesting operation. The controller operably controls the suspension system by adjusting the suspension force based on the slope of the field.

19 Claims, 13 Drawing Sheets

(56) References Cited

U.S. PATENT DOCUMENTS

| | | | |
|---|---|---|---|
| 5,535,577 A * | 7/1996 | Chmielewski | A01D 41/141 56/10.2 E |
| 5,704,200 A * | 1/1998 | Chmielewski, Jr. | A01D 41/141 56/10.2 E |
| 5,713,190 A * | 2/1998 | Vermeulen | A01D 41/141 56/10.2 E |
| 6,073,070 A * | 6/2000 | Diekhans | A01B 79/005 180/167 |
| 7,707,811 B1 * | 5/2010 | Strasser | A01D 41/141 56/10.2 E |
| 9,615,501 B2 * | 4/2017 | Pickett | A01B 69/004 |
| 9,693,502 B2 * | 7/2017 | Gofron | A01D 41/141 |
| 9,980,431 B2 * | 5/2018 | Long | A01D 41/127 |
| 2003/0000193 A1 * | 1/2003 | Beck | A01D 41/141 56/10.2 E |
| 2004/0006958 A1 * | 1/2004 | Thiemann | A01D 41/141 56/10.2 R |
| 2004/0040276 A1 * | 3/2004 | Allworden | A01D 41/141 56/10.2 R |
| 2008/0177449 A1 * | 7/2008 | Pickett | A01D 41/141 701/50 |
| 2010/0287900 A1 * | 11/2010 | Ringwald | A01D 41/141 56/17.1 |
| 2012/0174549 A1 * | 7/2012 | Schroeder | A01D 41/141 56/10.2 E |
| 2013/0283745 A1 | 10/2013 | Brendon et al. | |
| 2014/0000230 A1 * | 1/2014 | Kohlhase | A01D 41/141 56/10.2 E |
| 2014/0360149 A1 * | 12/2014 | Lohrentz | A01D 45/021 56/103 |
| 2015/0033692 A1 * | 2/2015 | Schroeder | A01D 41/141 56/10.2 E |
| 2016/0084987 A1 * | 3/2016 | Dybro | G01P 3/00 702/5 |
| 2016/0106021 A1 * | 4/2016 | Lohrentz | A01D 41/14 56/11.9 |
| 2016/0295796 A1 * | 10/2016 | Fischer | A01D 75/287 |
| 2017/0064904 A1 * | 3/2017 | Figgins | A01D 34/006 |
| 2018/0070531 A1 * | 3/2018 | Long | A01D 41/141 |
| 2018/0098491 A1 * | 4/2018 | Long | A01D 41/141 |
| 2018/0192587 A1 * | 7/2018 | Berggren | A01D 75/285 |
| 2018/0332768 A1 * | 11/2018 | Isaac | A01D 75/287 |
| 2019/0047345 A1 | 2/2019 | Dockter | |
| 2019/0059223 A1 * | 2/2019 | Seiders, Jr. | A01D 41/141 |
| 2019/0082598 A1 * | 3/2019 | Seiders, Jr. | A01D 75/287 |
| 2019/0230857 A1 * | 8/2019 | Thomson | A01D 41/145 |
| 2020/0000033 A1 * | 1/2020 | Shearer | A01D 47/00 |
| 2020/0128741 A1 * | 4/2020 | Brimeyer | F15B 1/024 |

* cited by examiner

METHOD AND APPARATUS FOR ADJUSTING A HARVESTING HEADER FLOAT SYSTEM BASED ON MACHINE PITCH OR TERRAIN AND SYSTEM THEREOF

FIELD OF THE DISCLOSURE

The present disclosure relates to a harvesting machine, and in particular, to a method and system of adjusting a suspension system based on machine pitch or changes in terrain.

BACKGROUND

Agricultural machines, such as a combine, may operate and harvest crops along different terrain and field conditions. For example, the machine can operate as the field conditions change from a dry, firm surface to a wet or muddy surface. Moreover, the machine can harvest crop in a field that has varying degrees of slope. Under these different conditions and varying terrain, the harvesting header attached to the machine may frown or raise out of a cut.

Thus, there is a need for a method and system to counteract frowning or raising out of a cut based on changes in terrain and field conditions.

SUMMARY

In one embodiment of the present disclosure, a harvesting header for traversing a field to perform a harvesting operation includes a first frame assembly adapted to be coupled to a work machine; a second frame assembly suspended forward of the first frame assembly, the second frame assembly configured to pivot relative to the first frame assembly; a suspension system coupled to the second frame assembly, the suspension system providing a suspension force to the second frame assembly; a controller operably coupled to the suspension system; and a slope detection system disposed in electrical communication with the controller, the slope detection system communicating a slope of the field to the controller during the harvesting operation; wherein, the controller operably controls the suspension system by adjusting the suspension force based on the slope of the field.

In one example of this embodiment, the slope detection system comprises a sensor for detecting a pitch of the machine or slope of the field, the sensor being coupled to the first frame assembly, the second frame assembly or the machine. In a second example, the slope detection system comprises a predefined topography map indicating the slope at any given location in the field. In a third example, the suspension system comprises an adjustment mechanism operably controlled by the controller to adjust the suspension force. In a fourth example, the adjustment mechanism comprises at least one hydraulic actuator, the controller controlling an amount of pressure to the at least one actuator to operably adjust the suspension force.

In a fifth example, a second sensor is in electrical communication with the controller, the second sensor configured to detect an actual hydraulic pressure of the at least one actuator; wherein, the controller operably adjusts the actual hydraulic pressure to a target hydraulic pressure in response to a change in slope or machine pitch. In a sixth example, the adjustment mechanism comprises an electric actuator in communication with the controller; and a coil spring coupled to the second frame assembly; wherein, the controller operably controls the electric actuator to adjust an amount of compression of the coil spring in response to the slope of the field.

In another embodiment of the present disclosure, a harvesting header for performing a harvesting operation in a field includes a first frame assembly adapted to be coupled to a feederhouse of a work machine; a second frame assembly suspended forward of the first frame assembly, the second frame assembly comprising a center frame, a first wing frame and a second wing frame; a suspension system coupled to the second frame assembly; an actuator of the suspension system providing a suspension force to the second frame assembly; a controller operably coupled to the actuator to adjust the suspension force; and a plurality of sensors disposed in electrical communication with the controller, the plurality of sensors including at least a first sensor for detecting a slope of the field and a second sensor for detecting a current pressure of the actuator during the harvesting operation; wherein, the controller operably controls the pressure of the actuator to adjust the suspension force based on the slope of the field.

In one example of this embodiment, the suspension system includes a plurality of suspension systems independently controlled by the controller based on the slope of the field, the plurality of suspension systems including a first suspension system coupled to the center frame, a second suspension system coupled to the center frame, a third suspension system coupled to the first wing frame, and a fourth suspension system coupled to the second wing frame. In a second example, the actuator includes a plurality of actuators for controlling the suspension force of each suspension system, the controller determining a target pressure for each of the plurality of suspension systems based on the slope of the field and operably controls the plurality of actuators to adjust the suspension force of each of the plurality of suspension systems based on the respective target pressure.

In a third example, the harvesting header may include a control system including a user interface in communication with the controller, the controller configured to receive an instruction from the user interface indicative of a current field condition; wherein, the controller operably commands a target pressure to the actuator in response to the current field condition and the slope of the field detected by the first sensor. In a fourth example, the header may include a control system including a user interface in communication with the controller, the controller configured to receive an instruction from the user interface indicative of an optimum suspension force; wherein, the controller operably sends a pressure command to the actuator to achieve the optimum suspension force; further wherein, the controller operably communicates a target pressure to the actuator to adjust the optimum suspension force in response to a change in slope of the field. In another example, the header may include control logic executable by the controller to determine a target pressure based on a given slope of the field.

In a further embodiment of the present disclosure, a method is provided for controlling a suspension system of a harvesting header, the harvesting header coupled to a work machine for performing a harvesting operation in a field, the method includes providing a first frame assembly, a second frame assembly suspended forward of the first frame assembly, the suspension system coupled to and providing a suspension force to the second frame assembly, a controller, an actuator, and a slope detection system; sending a first hydraulic pressure to the actuator to provide a suspension force to the second frame assembly; detecting a change in slope of the field with the slope detection system; communicating the change in slope to the controller from the slope detection system; determining a target pressure by the controller as a function of the change in slope; commanding target pressure to the actuator by the controller to adjust the suspension force in response to the change in slope, wherein the target pressure is different from the first hydraulic pressure.

In a first example of this embodiment, the detecting step comprises receiving the slope of the field from a topography map. In a second example, the target pressure is greater than the first hydraulic pressure when the slope detection system detects a downhill slope, and the target pressure is less than the first hydraulic pressure when the slope detection system detects an uphill slope. In a third example, the method may include receiving a command from a user input indicative of a desired suspension force of the suspension system at a level ground surface; determining the first hydraulic pressure as a function of the desired suspension force; and controlling a control valve by the controller to send the first hydraulic pressure to the actuator.

In a fourth example, the method may include detecting a current hydraulic pressure of the actuator by a sensor; communicating the current hydraulic pressure by the sensor to the controller; comparing the target pressure to the current hydraulic pressure; performing the commanding step if a difference between the target pressure and the current hydraulic pressure exceeds a threshold amount. In another example, the method may include receiving a command from a user input indicative of a current field condition; determining the first hydraulic pressure as a function of the current field condition; and controlling a control valve by the controller to send the first hydraulic pressure to the actuator.

In a further example of the present embodiment, the method may include providing the second frame assembly with a center frame, a first wing frame and a second wing frame; providing the suspension system with a first suspension system coupled to the center frame, a second suspension system coupled to the center frame, a third suspension system coupled to the first wing frame, and a fourth suspension system coupled to the second wing frame; and controlling the suspension force of each of the first suspension system, the second suspension system, the third suspension system, and the fourth suspension system independently of one another by the controller based on the change in slope of the field.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
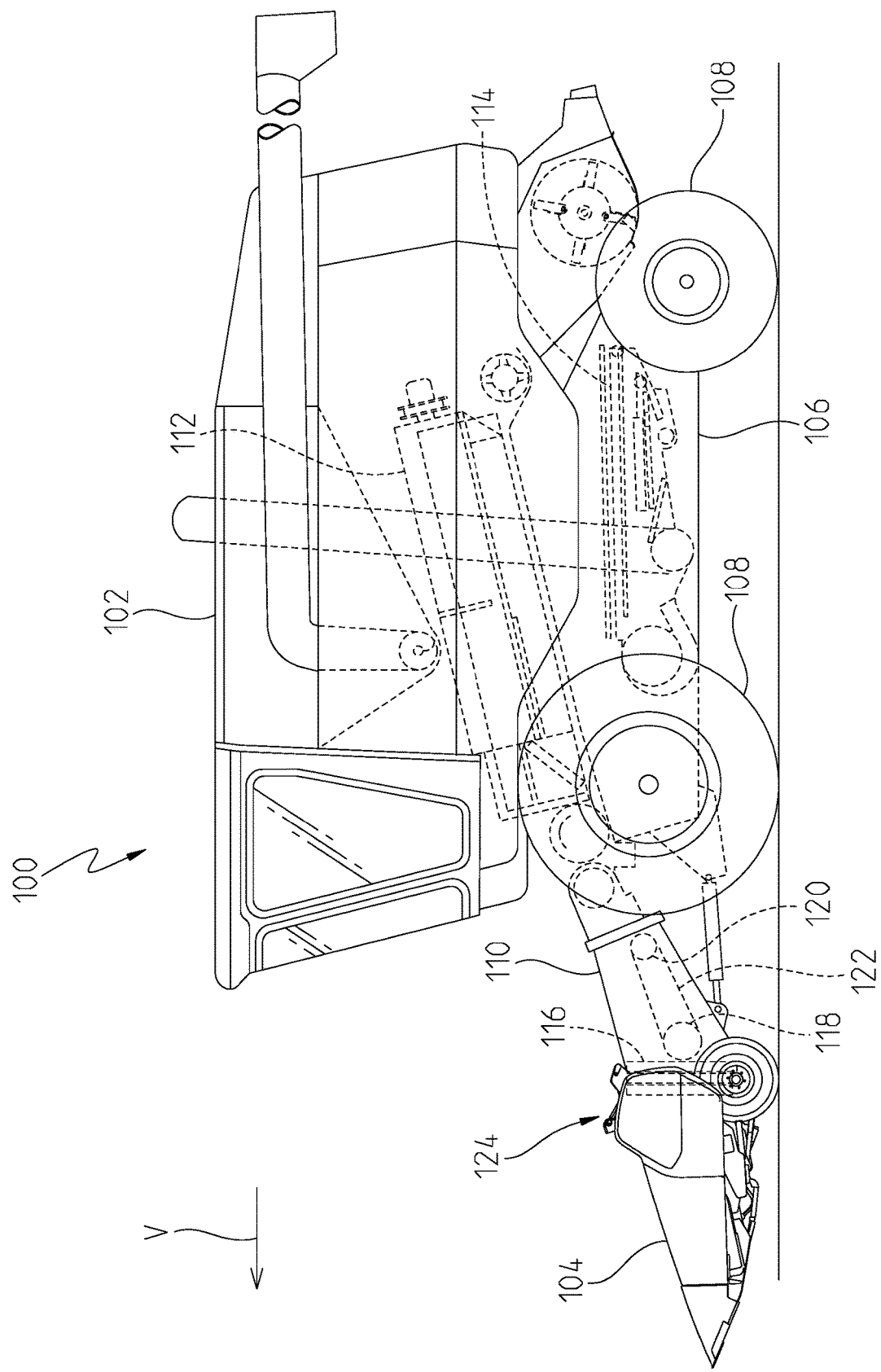
FIG. 1 is a side view of an agricultural harvester.
Figure 2:
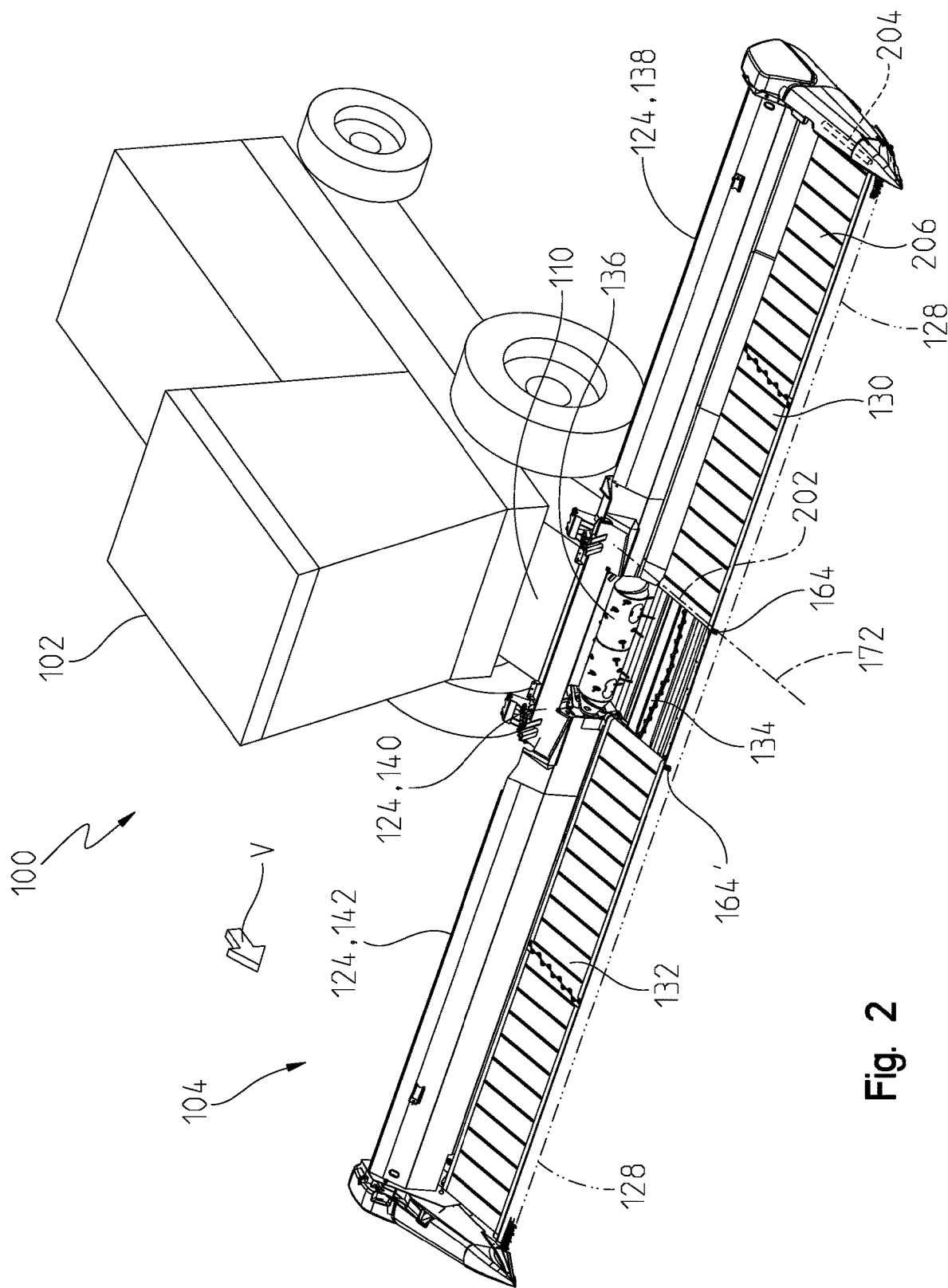
FIG. 2 is a perspective view of an agricultural harvesting head of the harvester of FIG. 1.
Figure 3:
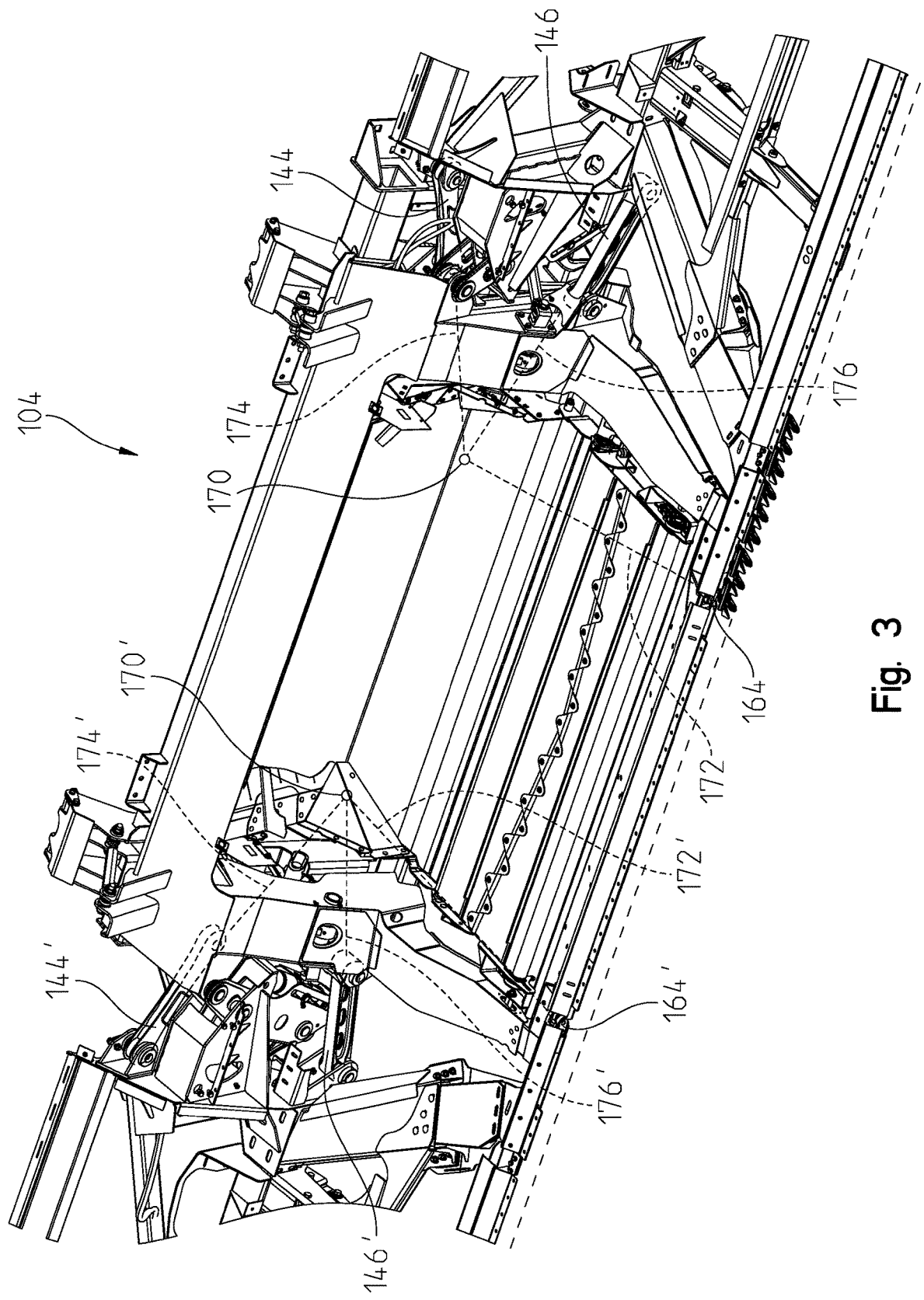
FIG. 3 is a partial front perspective view of the frames of the agricultural harvester of FIG. 2 with conveyors removed.
Figure 4:
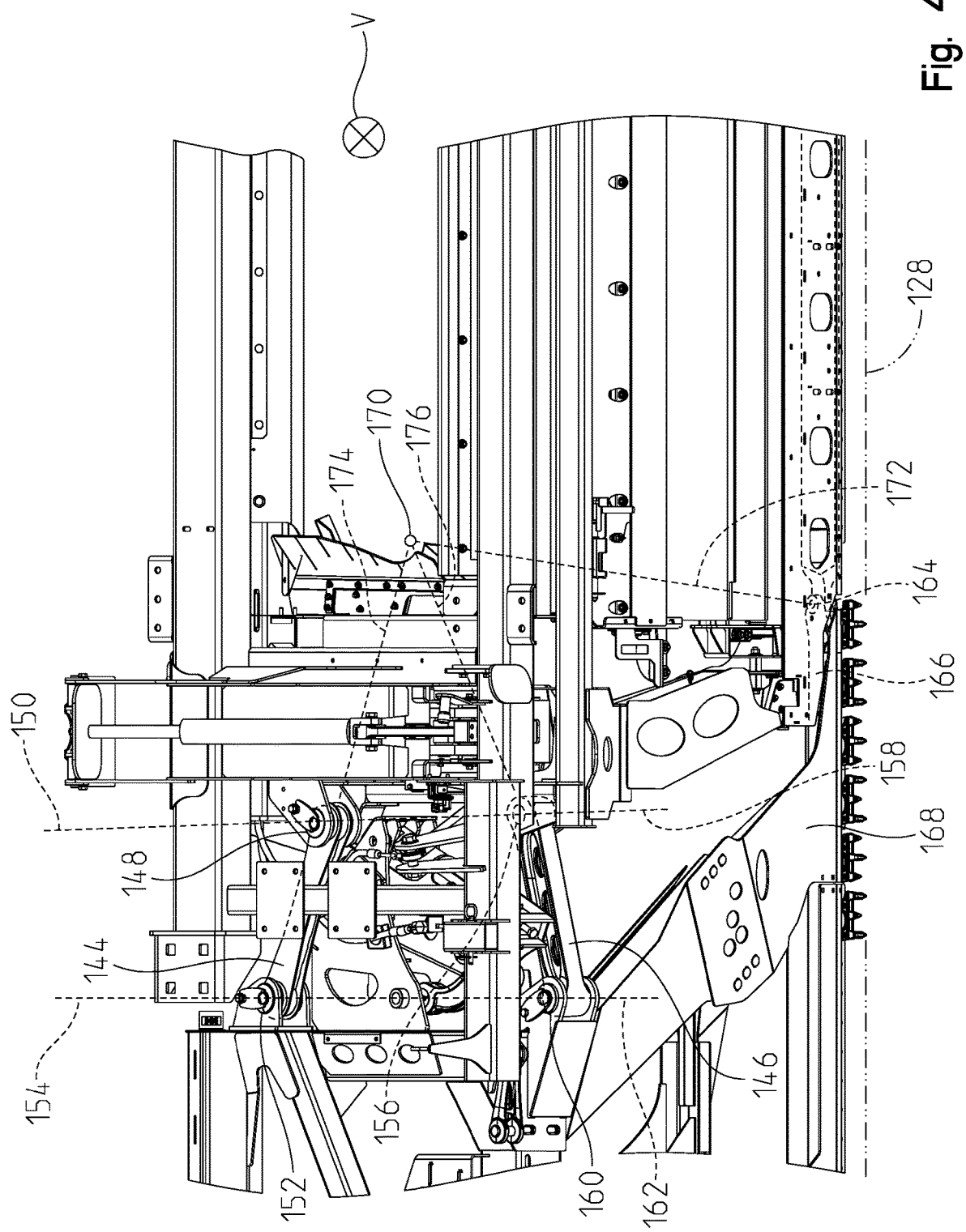
FIG. 4 is a partial front perspective view of the view of the center frame and adapter frame shown in FIG. 3.
Figure 5:
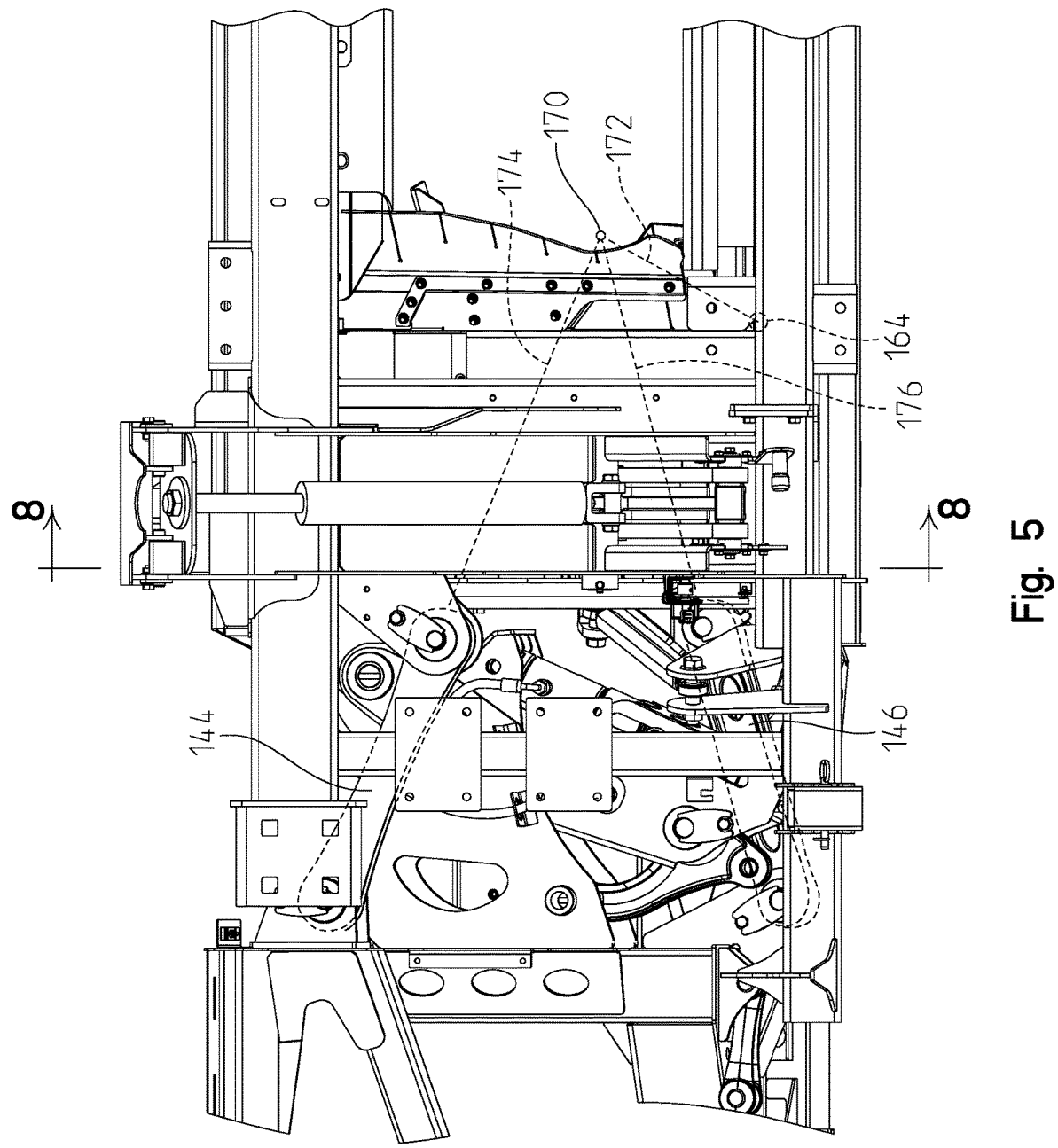
FIG. 5 is a slightly elevated fractional rear view of the frames shown in FIGS. 3-4.
Figure 6:
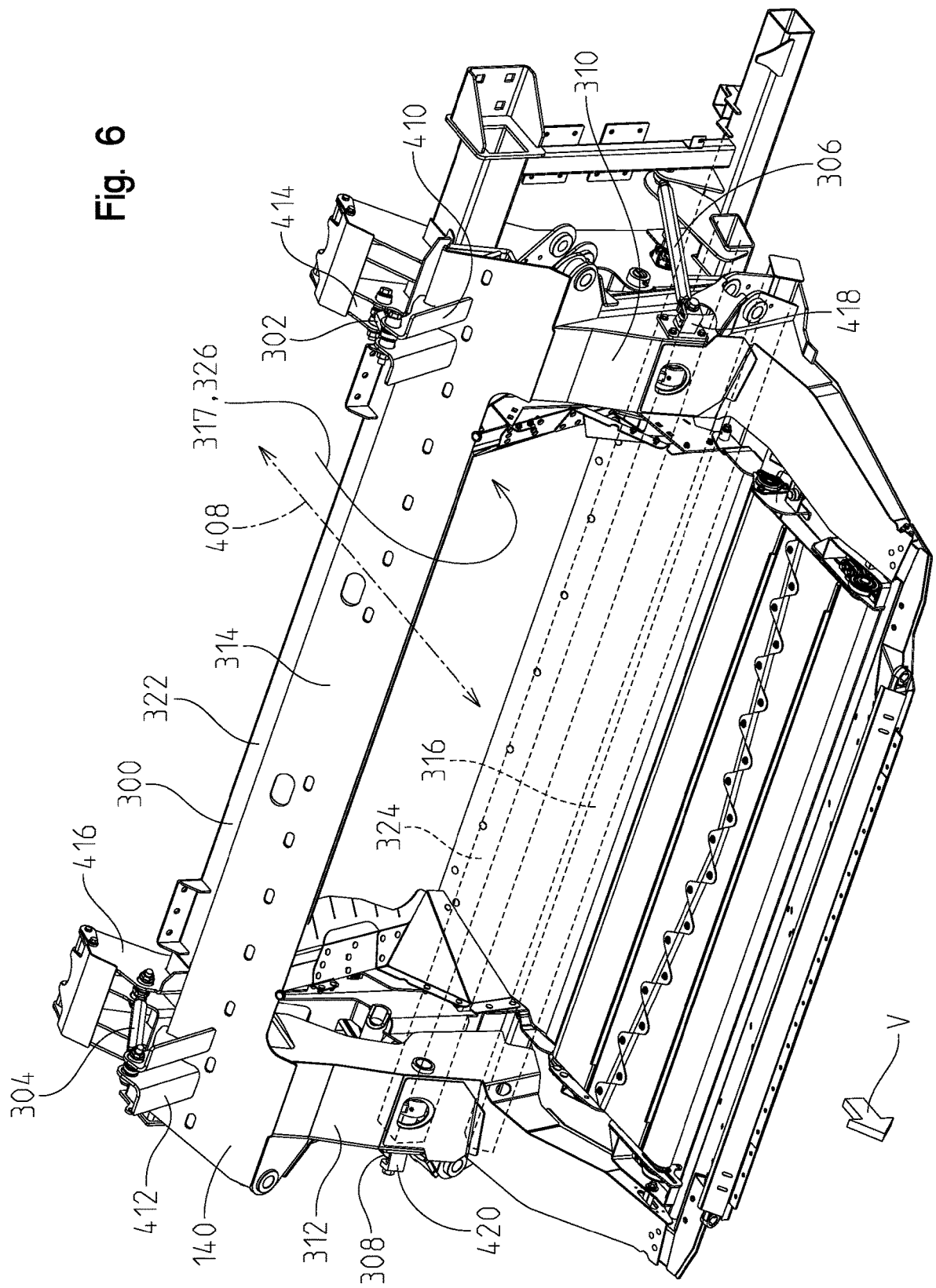
FIG. 6 is a fractional front perspective view of FIG. 3 with the left and right frames and linkages removed.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Agricultural harvesting heads can be long, on the order of 10-15 meters in overall length. In order to accurately follow the contours of the ground and sever crop at the appropriate point on the stem, agricultural harvesting heads have been made in sections that are generally hinged with respect to each other. A typical agricultural harvesting head of this type is formed in two or three sections that are pivotable with respect to each other. They pivot with respect to each other about a generally horizontal and fore-and-aft extending axis. Thus, a two section agricultural harvesting head would have one pivot axis, and a three-section agricultural harvesting head would have two pivot axes.

To better follow the contours of the ground, the agricultural harvesting head is mounted to the front of the feederhouse such that it can move with respect to the feeder house. In one arrangement the agricultural harvesting head is a draper head having three frame sections (a center section, a left-wing section and a right wing section). The frame sections can pivot up and down with respect to one another and thereby follow the contours of the ground.

In addition to that contour-following capability, the center frame section is mounted on an "adapter" that is fixed to the front of the feederhouse. This adapter permits the center frame section to move up and down with respect to the front of the feederhouse. It also permits the wing sections to move up and down with respect to the front of the feederhouse, since they are attached to and supported on the center frame section. An adjustable mechanism is often positioned between the adapter frame and the center frame section to hold the center frame section up in the air at an optimum cutting height with respect to the adapter. The adjustable mechanism is often manually adjusted to alter the cutting height of the center frame.

FIG. 1 illustrates an agricultural harvester 100 that has an agricultural combine 102 and an agricultural harvesting head 104. The agricultural combine 102 comprises a chassis 106 which is supported on four ground supports 108, as well as a threshing and separating system 112, a cleaning system 114, and a feederhouse 110 extending forward from the front of the agricultural combine 102. The agricultural combine 102 further comprises a grain storage chamber (also known as a "grain tank" or "grain reservoir") that is disposed at the top of the agricultural combine 102 and receives grain that has been threshed, separated, and cleaned.

The agricultural combine 102 is a self-propelled vehicle which is driven over the ground by a power source such as an electric motor or motors or an internal combustion engine. The ground supports 108 are preferably wheels or tracks. At least one of them are driven in rotation by motors to propel the agricultural combine 102 over the ground.

The feederhouse 110 is pivotally connected to the front of the agricultural combine and extends forward therefrom. The feederhouse 110 is generally in the form of a hollow and generally rectangular box having an endless belt conveyor disposed inside. The hollow rectangular box has an open forward end and an open rear end. The forward end of the feederhouse 110 defines a generally rectangular frame 116 that is configured to support the agricultural harvesting head 104. A front roller 118 is disposed immediately inside the frame 116. A corresponding rear roller 120 is disposed at the rear end of the feederhouse 110. The front roller 118 and the rear roller 120 support opposing ends of a conveyor belt 122. Each of the front roller 118 and the rear roller 120 may be in the form of a narrow shaft with a plurality of sprockets or gears that engage the inner surface of the conveyor belt 122. A rotary motor (electric, hydraulic, or pneumatic) is coupled to the rear roller 120 to drive the rear roller 120 in rotation. This rotation causes the conveyor belt 122 to recirculate in an endless fashion around the front roller 118 and the rear roller 120. The conveyor belt 122 has protrusions, such as cleats or lugs that engage a top surface of a mat of cut crop (not shown) that is presented to the frame 116. The movement of the conveyor belt 122 draws the mat into the feederhouse and carries it upward on the floor of the feederhouse until it is conveyed through the open rear end of the feederhouse 110 and sent to the threshing, separating and cleaning systems of the agricultural combine 102.

The frame 116 is generally rectangular and includes a top member and a bottom member that are generally parallel to each other, are spaced apart, and extend generally parallel to the longitudinal extent of the agricultural harvesting head 104. The frame 116 also includes a left side member and a right side member that are parallel to each other, spaced apart, and extend vertically.

The agricultural harvesting head 104 includes a laterally extending main frame 124 that extends perpendicular to a fore-and-aft harvesting direction of travel "V" of the agricultural harvester 100 and perpendicular to the longitudinal axis of the agricultural combine 102. The agricultural harvesting head 104 further includes an elongate reciprocating knife 128 that extends across almost the entire width of the agricultural harvesting head 104. This reciprocating knife is disposed immediately in front of three cut crop conveyors. These three cut crop conveyors include a left side conveyor 130 that carries cut crop from the left side of the agricultural harvesting head 104 to a central region of the agricultural harvesting head 104, a right side conveyor 132 that carries crop from the right side of the agricultural harvesting head 104 to the central region of the agricultural harvesting head 104, and a central conveyor 134 that receives crop from the left side conveyor 130 and the right side conveyor 132, and conveys the cut crop rearward and underneath a drum conveyor 136. Each of these three conveyors is an endless belt conveyor and is disposed immediately behind the reciprocating knife 128 to receive crop cut by the reciprocating knife 128.

The laterally extending main frame 124 includes three frame sections that are coupled together to pivot with respect to each other about fore-and-aft extending axes. Left frame section 138 extends from the outer left end of the agricultural harvesting head to a central region of the agricultural harvesting head 104. Center frame section 140 extends across a middle portion of the agricultural harvesting head 104. Right frame section 142 extends from the outer right end of the agricultural harvesting head 104 to the central region of the agricultural harvesting head 104.

The left side of conveyor 130 is supported on the left frame section 138. Several rollers, including a proximal roller 202 adjacent to the center frame section 140 and distal roller 204 adjacent to the leftmost end of the left frame section 138 are provided to support an endless belt 206. A motor drives the proximal roller 202 in rotation. The proximal roller 202 recirculates in turn the endless belt 206 about the proximal roller 202 and the distal roller 204. Crop material cut by the reciprocating knife 128 in front of the left frame section 138 falls upon the top surface of the endless belt 206 and is drawn toward the center frame section 140.

The inner end of the left frame section 138 is connected to the center frame section 140 to pivot up and down at its outer end with respect to the center frame section 140. The inner end of the right frame section 142 is connected to the center frame section 140 to pivot up and down at its outer end with respect to the center frame section 140.

An upper left link 144 and a lower left link 146 extend between and couple the left frame section 138 and the center frame section 140. An identically constructed and mirror image upper right link 144' and a lower right link 146' extend between and couple the right frame section 142 in the center frame section 140.

A proximal end of the upper left link 144 is coupled to the center frame section 140 by a first pivot joint 148 and is configured to pivot with respect to the center frame section 140 about a first axis 150 that extends generally in the direction of travel "V".

An opposing distal end of the upper left link 144 is coupled to the left frame section 138 by a second pivot joint 152 and is configured to pivot with respect to the left frame section 138 about a second axis 154 that extends in the direction of travel "V".

A proximal end of the lower left link 146 is coupled to the center frame section 140 by a third pivot joint 156 and is configured to pivot with respect to the center frame section 140 about a third axis 158 that extends in the direction of travel "V".

An opposing distal end of the lower left link 146 is coupled to the left frame section 138 by a fourth pivot joint 160 and is configured to pivot with respect to the left frame section 138 about a second axis 162 that extends in the direction of travel "V".

A hinge joint 164 is disposed adjacent to the reciprocating knife 128 at a forward edge of the agricultural harvesting head 104. The hinge joint 164 couples a forwardly extending member 166 of the center frame section 140 to a forwardly extending member 168 of the left frame section 138.

An identically constructed and mirror image hinge joint 164' is disposed adjacent to the reciprocating knife 128 and forward edge of the agricultural harvesting head 104. The hinge joint 164' couples a forwardly extending member of the center frame section 142 a forwardly extending member of the right frame section 138.

The attachment points of the proximal ends of the upper left link 144 and the lower left link 146 are closer together (as measured in a vertical direction) than the attachment points of the distal ends of the upper left link 144 and the lower left link 146.

The two attachment points of the upper left link 144 define a first construction line 174 extending through both of the attachment points of the upper left link 144. The two attachment points of the lower left link 146 define a second construction line 176 extending through the attachment points of the lower left link 146.

The first construction line and the second construction line are not parallel. When viewed from the rear of the agricultural harvesting head 104 they intersect each other at a point of intersection 170. Whenever the left frame section 138 pivots up and down with respect to the center frame section 140, these sections pivot with respect to each other about the point of intersection 170.

Since the right side of the agricultural harvesting head 104 is identically constructed (but in mirror image fashion) as the left side, the same intersection, pivot line, 1st construction line, and second construction line are also provided on the right side of the agricultural harvesting head 104 and are denoted with the numbers 170', 172', 174' and 176'.

In the illustrated example, the point of intersection 170 is located closer to the longitudinal and vertical midplane of the center frame section 140 than all four of the attachment points of the upper left link 144 and the lower left link 146 to the left frame section 138 and the center frame section 140.

The pivoting axis of the hinge joint 164 is disposed forward of and slightly below the point of intersection 170 of the two construction lines. Thus, the left frame section 138 is constrained by the hinge joint 164, the upper left link 144 and the lower left link 146 to pivot with respect to the center frame section 140 about a pivot line 172 that extends through the point of intersection 170 and through the pivoting axis of the hinge joint 164. The pivot line 172 also extends through or immediately adjacent to the reciprocating knife 128. In this manner, whenever the left frame section 138 pivots with respect to the center frame section 140, the reciprocating knife 128 (which extends across both the left frame section 138 and the center frame section 140) can flex without being damaged.

The reciprocating knife 128 is typically close to the ground where it can sever plant stalks close to the ground. The rear portion of the three frame sections, the upper left link 144 and the lower left link 146 are commonly elevated above the ground to provide ground clearance. For this reason, the pivot line 172 extends forward and slightly downwardly from the point of intersection 170 to the hinge joint 164.

The pivot line 172 extends through the proximal roller 202. The rotational axis of the proximal roller 202 is collinear with the pivot line 172. Thus, when the left frame section 138 pivots up and down with respect to the center frame section 140, the proximal roller 202 does not move with respect to the left frame section 138 and the center frame section 140.

The center frame section 140 is illustrated coupled to and supported on an adapter frame 300. The adapter frame 300 is in turn coupled to and supported on the feederhouse frame 116. Four links, including an upper left link 302, an upper right link 304, a lower left link 306, and a lower right link 308 are coupled to and between the center frame section 140 and the adapter frame 300. A forward end of each of the four links is coupled to the center frame section 140 and a rear end of each of the four links is coupled to the adapter frame 300. The four links extend at least partially fore-and-aft.

The center frame section 140 is generally rectangular and extends vertically and transverse to the direction of travel "V". It has two laterally spaced apart vertical side members 310, 312, an upper horizontal member 314 that is fixed at both ends to an upper portion of the side members 310, 312, and a lower horizontal member 316 that is fixed at both ends to a lower portion of the side members 310, 312. The lower horizontal member 316 is spaced apart and disposed below the upper horizontal member 314. The side members 310, 312 are parallel to each other. The upper horizontal member 314 and the lower horizontal member 316 are parallel to each other. These four members 310, 312, 314, 316 are fixed together to define a rigid rectangular frame having a central aperture 317 configured to receive and transmit all the cut crop harvested by the agricultural harvesting head 104.

The adapter frame 300 is generally rectangular and extends vertically and transverse to the direction of travel "V". It has two laterally spaced apart vertical side members 318, 320, an upper horizontal member 322 that is fixed at both ends to an upper portion of the side members 318, 320, and lower horizontal member 324 that is fixed at both ends to a lower portion of the side members 318, 320. The lower horizontal member 324 is spaced apart and disposed below the upper horizontal member 322. The side members 318, 320 are parallel to each other. The upper horizontal member 322 and the lower horizontal member 324 are parallel to each other. These four members 318, 320, 322, 324 are fixed together to define a rigid rectangular frame having a central aperture 326 that is configured to receive and transmit all the cut crop material harvested by the agricultural harvesting head 104, and in particular to receive all the cut crop material conveyed through the central aperture 317 of the center frame section 140.

The four links 302, 304, 306, 308 extend between and are coupled to the center frame section 140 and the adapter frame 300. The two lower links 306, 308 have the same length. Each of the four links 302, 304, 306, 308 may be formed as turnbuckles with threaded ball joints at each end to permit the length of the links (and thus the angle of the mainframe 124) to be readily adjusted for a variety of crops. Alternatively, the four links 302, 304, 306, 308 may have a fixed length.

The four links are coupled at their forward ends to the center frame section 140 and at their rear ends to the adapter frame 300. The pivot joints that couple the links to the frames permit the frames to move up and down with respect to each other, and permit the frames to rotate with respect to each other about an axis 408 that extends in a fore-and-aft direction. This axis extends through the central apertures of both the center frame section 140 and the adapter frame 300.

The upper links (links 302, 304) are spaced apart and are pivotally coupled at their forward ends to brackets 410, 412, respectively. Brackets 410, 412 are fixed to and extend upward from the upper horizontal member 314. The brackets are spaced apart on the upper horizontal member 314. Bracket 410 is fixed to the upper horizontal member 314 adjacent to the upper end of the vertical side member 310. Bracket 412 is fixed to the upper horizontal member 314 adjacent to the upper end of the vertical side member 312.

The upper links (links 302, 304) are spaced apart and are pivotally coupled at their rear ends to brackets 414, 416, respectively. Brackets 414, 416 are fixed to and extend upward from the upper horizontal member 322 of the adapter frame 300. The brackets are spaced apart on the upper horizontal member 322. Bracket 414 is fixed to the upper horizontal member 322 adjacent to the upper end of the vertical side member 318. Bracket 416 is fixed to the upper horizontal member 322 adjacent to the upper end of the vertical side member 320.

Figure 7:
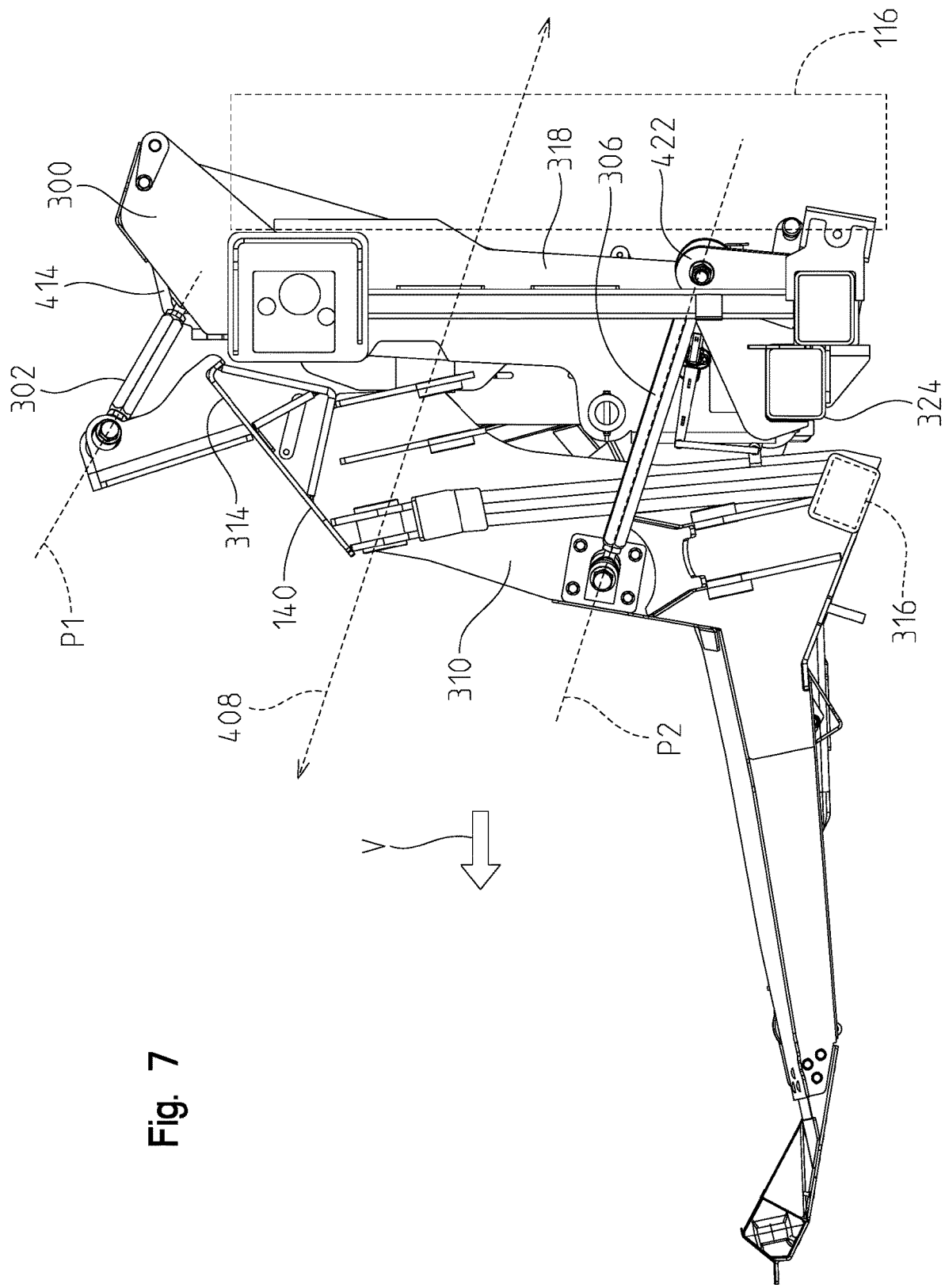
FIG. 7 is a left side view of the arrangement illustrated in FIG. 6.
Figure 8:
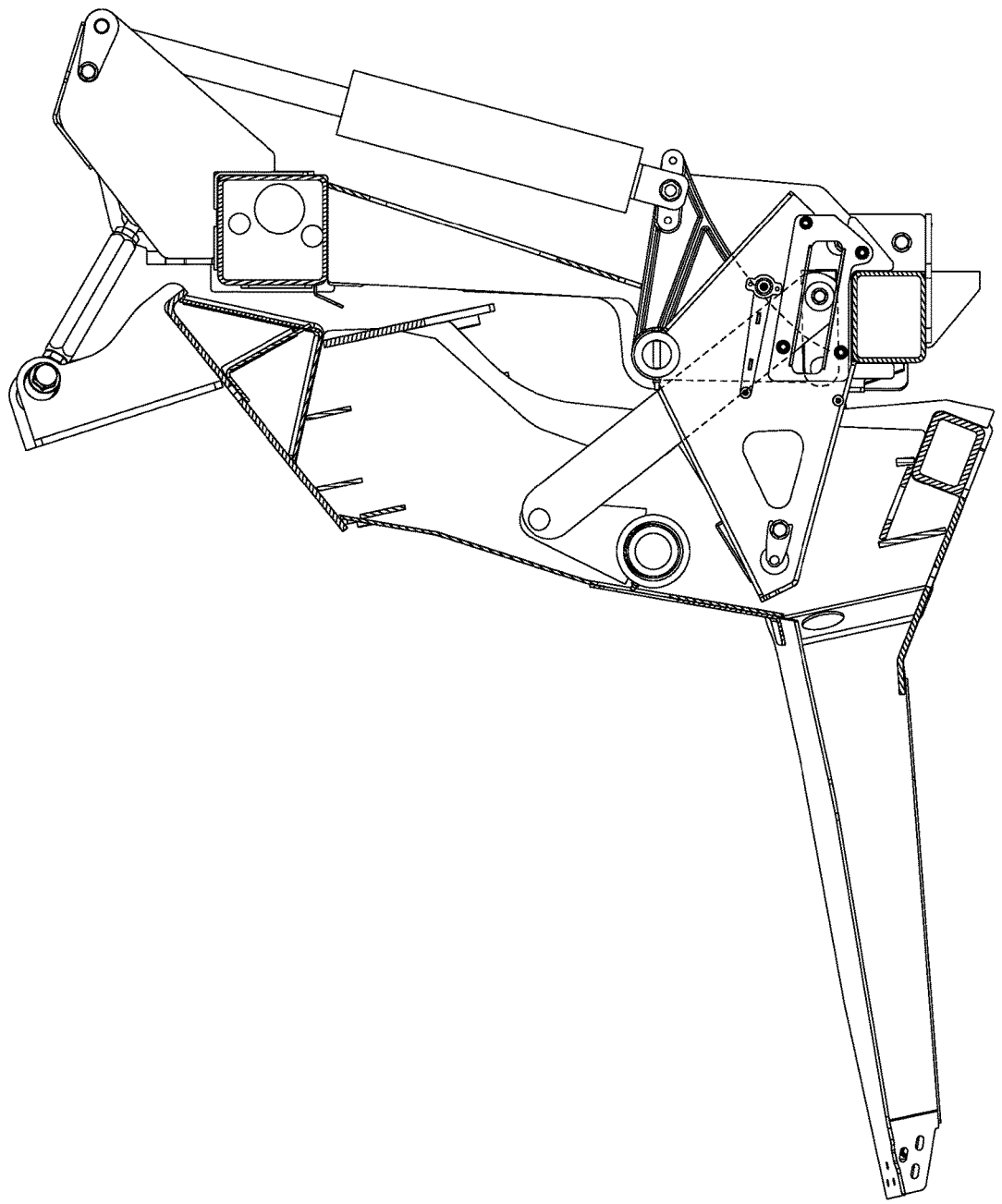
FIG. 8 is a fragmentary left side view of a linkage taken at section line 8-8 in FIG. 5.

The two upper links 302, 304 have the same length between their pivot connections to the frames at each end. The two upper links 302, 304 lie in a first common plane "P1" (see FIG. 7).

The lower links (links 306, 308) are spaced apart and are pivotally coupled at their forward ends to brackets 418, 420, respectively. Bracket 418 is fixed to and extends laterally outward from a lower portion of vertical side member 310 adjacent to the left end of lower horizontal member 316. Bracket 420 is fixed to and extends laterally outward from a lower portion of vertical side member 312 adjacent to the right end of lower horizontal member 316.

The lower links (links 306, 308) are spaced apart and are pivotally coupled at their rear ends to brackets 422, 424, respectively. Bracket 422 is fixed to and extends upward from a lower left portion of adapter frame 300. Bracket 424 is fixed to and extends upward from a lower right portion of adapter frame 300. The two lower links 306, 308 have the same length between their pivot connections to the frame at each end. The two lower links 306, 308 lie in a second common plane.

When viewing the center frame section 140 and the adapter frame 300 from the rear, the links 302, 304, 306, 308 are disposed at the upper left, upper right, lower left, and lower right corners of the apertures 317, 326. The links collectively surround the apertures 317, 326.

All four of the links 302, 304, 306, 308 extend generally fore-and-aft and are generally parallel. However, they are not perfectly parallel, nor do they extend perfectly fore-and-aft. In fact, they are slightly nonparallel in order to provide particular benefits that four perfectly parallel links would not provide.

In particular, the two upper links 302, 304 extend forward and outward. Thus, the distance between the two upper links at their pivotal attachment points on the center frame section 140 is greater than the distance between the two upper links at their pivotal attachment points on the adapter frame 300. The two lower links 306, 308 extend forward and inward. Thus, the distance between the two lower links at their attachment points on the center frame section 140 is less than the distance between the two lower links at their attachment points on the adapter frame 300.

By arranging the spacing of the attachment points (and therefore the direction the two upper links and the two lower links extend) as shown, the center frame section 140 and the adapter frame 300 cannot be translated side to side with respect to each other. If a great force was applied to force side to side (lateral) translation of the two frames with respect to the other, either one or more of the links will break and/or one or more of the frames will break. The links and the frames are robust enough that during normal operation no such lateral translation nor any link or frame breakage will occur under normal operational loading.

While four links 302, 304, 306, 308 are illustrated and described herein, the adapter frame 300 may also be coupled to the center frame section 140 with only three links as is known in the art. Accordingly, this disclosure contemplate utilizing any number of links, or no links at all, in order to pivotally coupled the frame section 140 to the adapter frame.

An actuator or the like couples the adapter frame 300 to the center frame section 140. The actuator may support the weight of the center frame section 140 and the components coupled thereto, such that the center frame section is partially or fully suspended in a floating position on links 302, 304, 306, 308.

As is discussed in more detail herein, in one aspect of this disclosure the operator can adjust actuator (see center actuator 902 of FIG. 9) to provide a large lifting force on the center frame section 140 that support substantially the entire weight of the agricultural harvesting head 104. The operator will adjust this large lifting force such that the ground force acting upward against the bottom of the agricultural harvesting head 104 is quite small.

The operator desires that the ground force stays relatively constant. If the ground force increases, it may cause the reciprocating knife 128 to dig into the ground. If the ground force decreases the reciprocating knife 128 may be lifted entirely off the ground, away from the plant stalks it is supposed to cut.

The center actuator 902 applies a constant upward force against the main frame 124 in a wide range of operating positions, and therefore maintains a constant ground force against the ground. The center actuator 902 may include a left side center actuator 902 and a right side center actuator 902. The left side center actuator 902 extends between and couples the adapter frame 300 and the center frame section 140 on the left side of the adapter frame 300. The right side center actuator 902 extends between and couples the adapter frame 300 and the center frame section 140 on the right side of the adapter frame 300. The two actuators 902 and corresponding linkages are similarly constructed and are substantially mirror images of each other. Therefore the construction and operation of the left side center actuator 902 is substantially the same as the right side center actuator 902.

Similarly, the right and left frame section 142, 138 may implement one or more actuator (see first actuator 1008 and second actuator 1016 of FIG. 10) to modify the ground force experienced by the corresponding right and left frame sections 142, 138 as the agricultural harvesting head 104 travels there along. Accordingly, as discussed in more detail herein the agricultural harvesting head 104 may require adjustments to both the center actuators 902 to modify the center frame section 140 and the first and second actuators 1008, 1016 to modify the response of the right and left frame section 142, 138 to properly adjust the way the agricultural harvesting head 104 responds to ground force changes.

Figure 9:
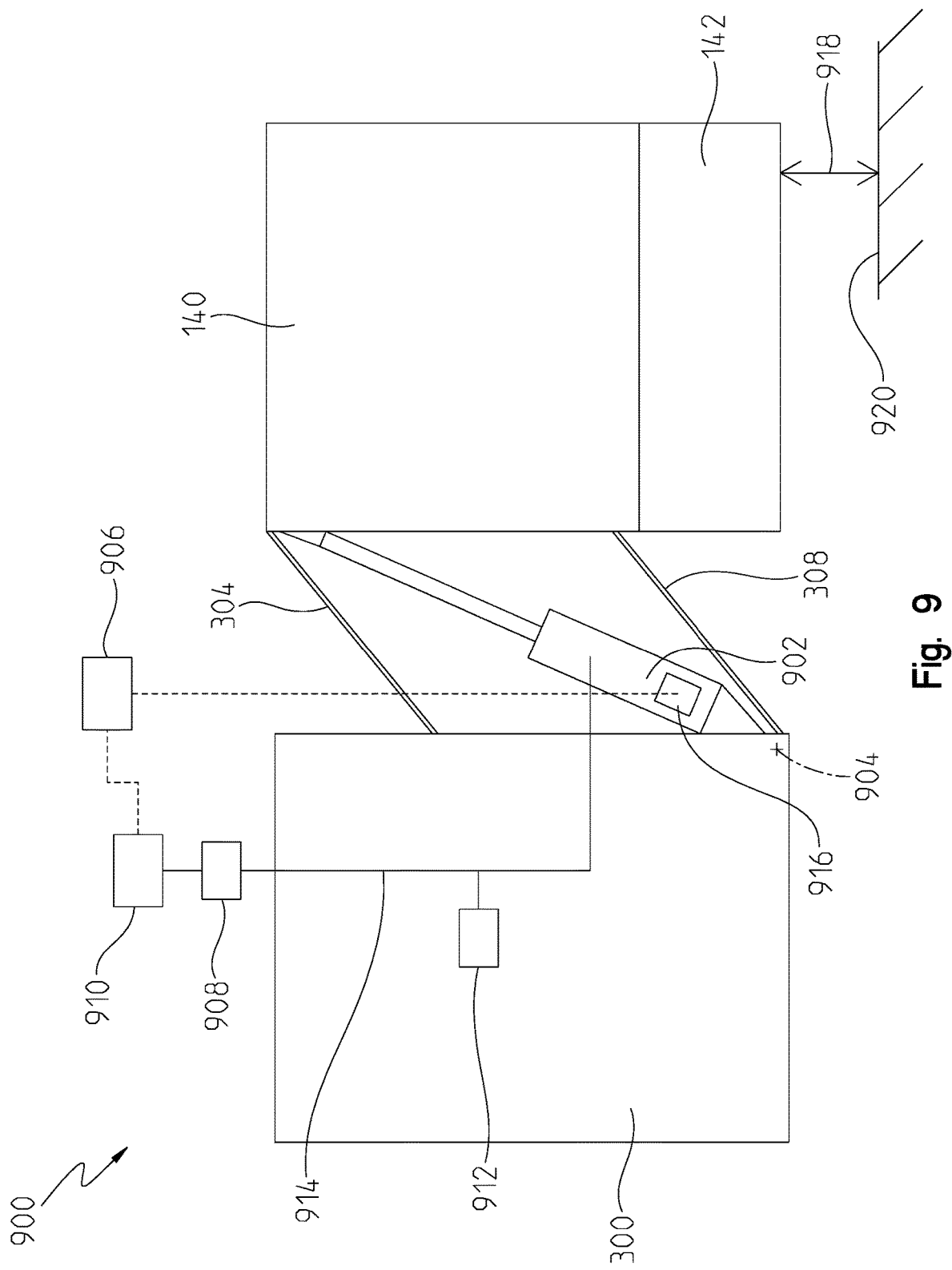
FIG. 9 is a schematic side view of one embodiment of an adapter frame coupled to a center frame.

Referring now to FIG. 9, a schematic side view 900 of one embodiment of this disclosure is illustrated. The schematic side view 900 is meant to generally illustrate one example of a coupling configuration between the adapter frame 300 and the center frame 140. While FIGS. 1-8 show and describe a very specific way to pivotally couple the agricultural harvesting head 104 to the agricultural combine102, a person skilled in the art understands the teaching discussed herein can be applied to any configuration that has an adjustable center section and at least one arm assembly regardless of the exact methodology used to pivotally couple the assemblies to one another.

Accordingly, this disclosure contemplates coupling the adapter frame 300 to the center frame 140 utilizing any mechanical configuration known in the art wherein an actuator, spring, or the like can be implemented to reposition the center frame 140 relative to the adapter frame 300. Further, while the center frame 140 is illustrated and discussed herein as being coupled to the feederhouse frame 116 of the feederhouse 110, in other embodiments the center frame 140 is pivotally coupled directly to the chassis 106.

Accordingly, the center frame 140 can be pivotally coupled to any portion of the harvester 100.

In the schematic side view 900, the upper right link 304 and lower right link 308 are illustrated extending from the adapter frame 300 to the center frame 140. Similarly, upper and lower left links may extend from the adapter frame 300 to the center frame 140 although the left links are not visible in the side view of FIG. 9. Further, left and right frame sections 138, 142 may be pivotally coupled to the center frame 140 as discussed herein (left frame section not visible in FIG. 9).

In one aspect of this disclosure, one or more center actuator 902 may be positioned between the adapter frame 300 and the center frame 140 to cause the center frame 140 to move relative to the adapter frame 300. While only one center actuator 902 is illustrated and discussed with reference to FIG. 9, one embodiment of this disclosure implements a left and right side center actuator 902. Further, in one non-exclusive example, the center actuator 902 may be a linear actuator such as a hydraulic cylinder. In this example, the center actuator 902 can extend and contract to thereby alter the positioned of the center frame 140 relative to the adapter frame 300. More specifically, the center frame 140 may be coupled to the adapter frame utilizing a four-bar or the like linkage assembly as discussed herein. In this configuration, the center actuator 902 may be repositioned to pivot the center frame 140 partially around a center axis 904 defined by a pivot point of the lower link 308. Accordingly, as the center actuator 902 is repositioned, the center frame 140 may raise and lower correspondingly relative to the adapter frame 300.

In one aspect of this disclosure, there may be two center actuators 902 coupled between the adapter frame 300 and the center frame 140. Further still, on other embodiments there may be more than two center actuators 902. Accordingly, this disclosure contemplates utilizing any number of center actuators 902 required to address the expected loads on the center frame 140.

The center actuator 902 may be any known type of actuator. More specifically, the center actuator 902 may be a pneumatic or hydraulic actuator that utilizes a piston and rod at least partially within a cylinder to accommodate linear displacement based on a fluid provided to chambers of the cylinder at a pressure and volume. Further still, the center actuator 902 may be an electrically powered linear actuator that is capable of linear displacement based on the electrical power provided thereto. Accordingly, this disclosure contemplates utilizing any type of actuator capable of linear displacement known in the art as the center actuator 902.

Regardless the type of actuator, the center actuator 902 may be controlled by a controller 906. For example, if the center actuator 902 is a hydraulic or pneumatic actuator, the controller 906 may selectively change the fluid pressure provided to the center actuator 902 through a center valve 908. More specifically, the center valve 908 may be a variable valve that allows the controller to selectively couple the center actuator 902 to a fluid source 910 at varying pressures. Alternatively, if the center actuator 902 is an electrical actuator, the controller 906 may control the electrical power provided to the center actuator 902.

In one embodiment of FIG. 9, the center actuator 902 is a hydraulic actuator coupled to a hydraulic source 910, such as a pump, through the center valve 908. As discussed herein, the center valve 908 may be a variable valve controlled by the controller 906 to selectively fluidly couple the center actuator 902 to the hydraulic source 910 at a fluid pressure that corresponds with performance characteristics identified by the controller 906. Further still, in one embodiment an accumulator 912 may be fluidly coupled to a fluid line 914 that fluidly couples the center valve 908 to the center actuator 902. The accumulator 912 may be any known type of hydraulic accumulator that allows the center actuator 902 to springedly support the center frame 140. More specifically, while the controller 906 may alter the fluid pressure provided to the center actuator 902 with the center valve 908 to raise or lower the center frame 140 relative to the adapter frame 300, the accumulator 912 may allow the center actuator 902 to address force changes with a spring like response. In other words, if the center actuator experiences an excessive compressive force, the fluid therein may be forced into an expanding fluid chamber of the accumulator 912 allowing the center actuator to be linearly displaced by the compressive force.

In another aspect of this disclosure, a center frame sensor 916 may be in communication with the controller 906 to identify a value. In the example where the center actuator 902 is a hydraulic or pneumatic actuator, the center frame sensor 916 may be a pressure sensor fluidly coupled to the center actuator 902 or other portion of the fluid line 914 to identify a fluid pressure therein. Alternatively, in another example the center frame sensor 916 may be a position sensor that identifies the position of an actuator rod relative to an actuator cylinder. In other embodiments the center frame sensor 916 is a position sensor coupled to a linkage or the like to identify the position of the center frame 140 relative to the adapter frame 300. Further still, one embodiment considered herein includes both a position sensor and a pressure sensor as part of the center frame sensor 916.

Regardless of the type or location of the center frame sensor 916, the controller 906 may utilize the values identified by the center frame sensor 916 to indicate the performance characteristics of the center frame 140 relative to the adapter frame 300. More specifically, if the center frame sensor 916 is a pressure sensor, the values identified by the controller 906 may indicate the load on the center actuator 902. Further still, higher pressures may indicate to the controller 906 that the center frame 140 is at least partially raised relative to the underlying surface. In yet another embodiment, higher pressures may indicate a softer response (or softer ground force response) of the center actuator 902 to movement of the center frame 140 relative to the adapter frame 300. That is to say, the center actuator 902 may provide a biasing force to the agricultural harvesting head 104 away from the underlying surface.

Similarly, when the center frame sensor 916 is a position sensor, the values communicated to the controller 906 may indicate the position of the center frame 140 relative to the adapter frame 300. In other words, the center frame sensor 916 may be utilized by the controller 906 to identify a height 918 of the center frame 140 above an underlying surface. More specifically, in one non-exclusive embodiment the height of the adapter frame 300 above the underlying surface 920 may be substantially constant but the height 918 of the center frame 140 may vary based on the position of the center actuator 902.

Figure 10:
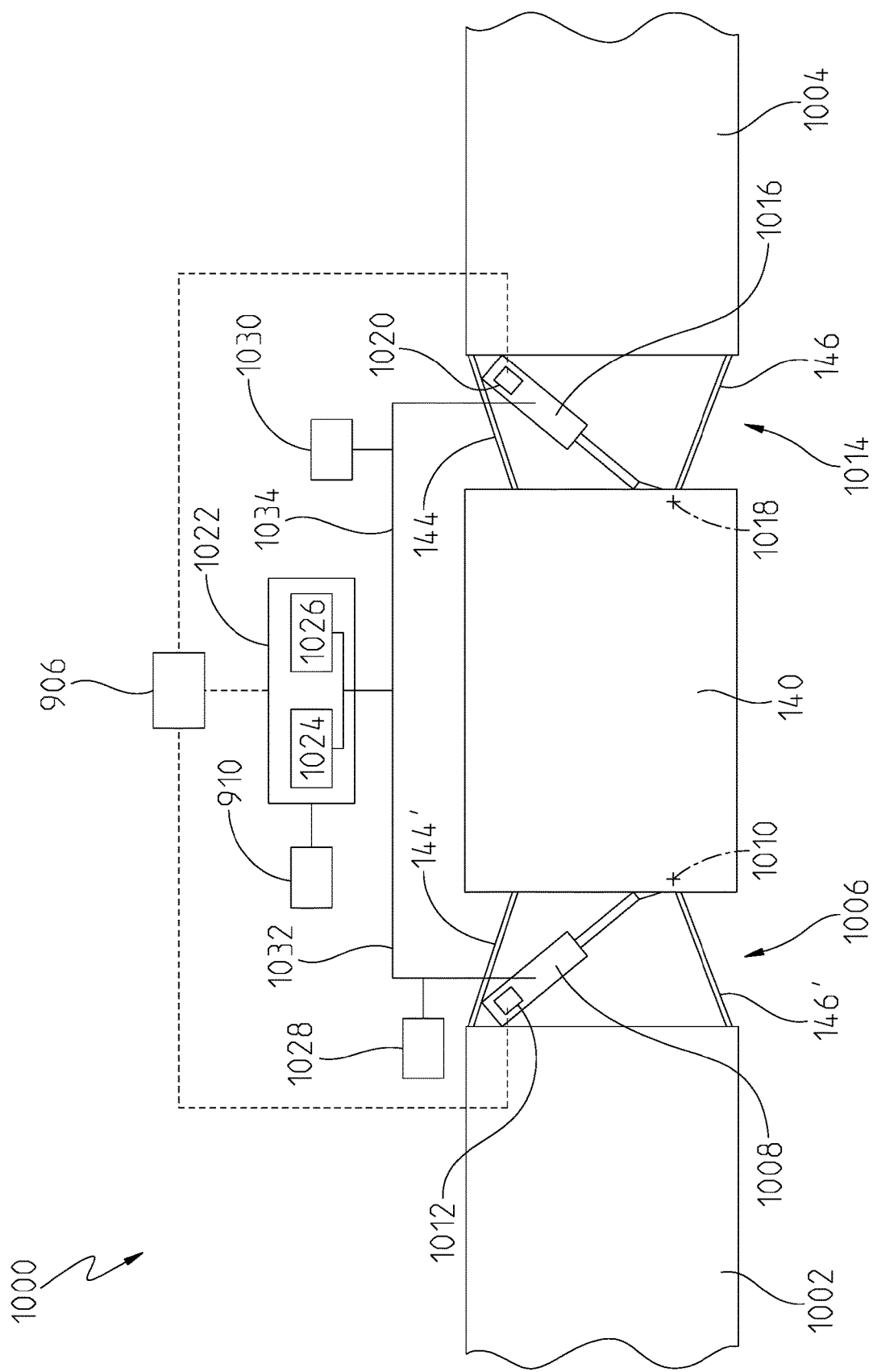
FIG. 10 is a schematic back view of the center frame of FIG. 9 coupled to a first and second frame arm assembly.

Referring now to FIG. 10, a schematic front view 1000 of the agricultural harvesting header 104 is illustrated. More specifically, the center frame 140 is illustrated pivotally coupled to a first arm assembly 1002 and a second arm assembly 1004. The first arm assembly 1002 may be comprised of the right frame section 142 and other portions associated therewith as discussed herein. The first arm assembly 1002 may be pivotally coupled to the center frame 140 via a first linkage assembly 1006. Further, the first linkage assembly 1006 may include the upper right link 144' and the lower right link 146' as discussed herein. However, any pivotal coupling assembly known in the art may be implemented for the first linkage assembly 1006. Further still, in one non-exclusive example the first arm assembly 1002 may be pivotally coupled directly to the center frame 140 without utilizing the first linkage assembly 1006 at all.

In one aspect of this disclosure, a first actuator 1008 may be coupled to the first arm assembly 1002 on one end and to the center frame 140 on the other end. Further, the first actuator 1008 may be repositionable to pivot the first arm assembly 1002 at least partially about a first arm axis 1010. A first arm sensor 1012 may also be positioned to identify a value indicating the relationship of the first arm assembly 1002 relative to the center frame 140. The first arm sensor 1012 may be a pressure sensor or a position sensor, among other types of sensors, similar to the center frame sensor 916.

In another aspect of this disclosure, the first actuator 1008 may not be coupled to the center frame 140 at all. Rather, in this embodiment the first actuator 1008 may be coupled to the first arm assembly 1002 or a linkage thereof on one end, and to the adapter frame 300 on the other. Alternatively, the first actuator 1008 may be coupled to any other portion of the agricultural harvester 100. A person skilled in the relevant art understands the many different locations wherein the first actuator 1008 may be coupled between the first arm assembly 1002 and other components of the agricultural harvester 100 to allow the first arm assembly 1002 to be pivotal relative to the center frame 140. Accordingly, this disclosure contemplates positioning the first actuator 1008 in any location that allows the first actuator 1008 to reposition the first arm assembly 1002 or provide different float force characteristics thereto.

Similarly, the second arm assembly 1004 may be comprised of the left frame section 138 and other portions associated therewith as discussed herein. The second arm assembly 1004 may be pivotally coupled to the center frame 140 via a second linkage assembly 1014. Further, the second linkage assembly 1014 may include the upper left link 144 and the lower left link 146 as discussed herein. However, any pivotal coupling assembly known in the art may be implemented for the second linkage assembly 1014. Further still, in one non-exclusive example the second arm assembly 1004 may be pivotally coupled directly to the center frame 140 without utilizing the second linkage assembly 1014 at all.

In one aspect of this disclosure, a second actuator 1016 may be coupled to the second arm assembly 1004 on one end and to the center frame 140 on the other end. Further, the second actuator 1016 may be repositionable to pivot the second arm assembly 1004 at least partially about a second arm axis 1018. A second arm sensor 1020 may also be positioned to identify a value indicating the relationship of the second arm assembly 1004 relative to the center frame 140. The second arm sensor 1020 may be a pressure sensor or a position sensor, among other types of sensors, similar to the center frame sensor 916. In another aspect of this disclosure, the second actuator 1016 may not be coupled to the center frame 140 at all. Rather, in this embodiment the second actuator 1016 may be coupled to the second arm assembly 1004 or a linkage thereof on one end, and to the adapter frame 300 on the other. Alternatively, the second actuator 1016 may be coupled to any other portion of the agricultural harvester 100. A person skilled in the relevant art understands the many different locations wherein the second actuator 1016 may be coupled between the second arm assembly 1004 and other components of the agricultural harvester 100 to allow the second arm assembly 1004 to be pivotal relative to the center frame 140. Accordingly, this disclosure contemplates positioning the second actuator 1016 in any location that allows the second actuator 1016 to reposition the second arm assembly 1004 or provide different float force characteristics thereto.

In one embodiment of FIG. 10, the first and second actuators 1008, 1016 are hydraulic actuators coupled to the hydraulic source 910, through a valve assembly 1022. The valve assembly 1022 may have a first valve 1024 that selectively controls the fluid pressure provided to the first actuator 1008 and a second valve 1026 that selectively controls the fluid pressure provided to the second actuator 1016. Each of the first and second valves 1024, 1026 may be variable valves controlled by the controller 906 to selectively fluidly couple the corresponding actuators 1008, 1016 to the hydraulic source 910 at a fluid pressure that corresponds with performance characteristics identified by the controller 906.

In one embodiment, accumulators 1028, 1030 may be fluidly coupled to fluid lines 1032, 1034 that fluidly couple the valves to the corresponding actuators 1008, 1016. The accumulators 1028, 1030 may be any known type of hydraulic accumulator that allows the corresponding actuators 1008, 1016 to springily support the corresponding arm assembly 1002, 1004. More specifically, while the controller 906 may alter the fluid pressure provided to the actuators 1008, 1016 with the valve assembly 1022 to raise or lower the corresponding arm assemblies 1002, 1004 relative to the center frame 140, the accumulators 1028, 1030 may allow the actuators 1008, 1016 to address force changes with a spring like response. In other words, if the actuators 1008, 1016 experiences an excessive compressive force, the fluid therein may be forced into an expanding fluid chamber of the accumulators 1028, 1030 similar to the accumulator 912.

In the example where the actuators 1008, 1016 are hydraulic or pneumatic actuators, the sensors 1012, 1020 may be pressure sensors fluidly coupled to the actuators 1008, 1016 or other portion of the fluid lines 1032, 1034 to identify a fluid pressure therein. Alternatively, in another example the sensors 1012, 1020 may be position sensors that identify the position of an actuator rod relative to an actuator cylinder. In other embodiments the sensors 1012, 1020 are position sensors coupled to a linkage or the like to identify the position of the corresponding arm assembly 1002, 1004 relative to the center frame 140. Further still, one embodiment considered herein includes both a position sensor and a pressure sensor as part of the sensors 1012, 1020.

Regardless of the type or location of the sensors 1012, 1020, the controller 906 may utilize the values identified by the sensors 1012, 1020 to indicate the performance characteristics of the of the corresponding arm assembly 1002, 1004 relative to the center frame 140. More specifically, if the sensors 1012, 1020 are pressure sensors, the values identified by the controller 906 may indicate the load on the corresponding arm assembly 1002, 1004 or the expected ground force response. Further still, higher pressures may indicate to the controller 906 that the corresponding arm assembly 1002, 1004 is at least partially raised relative to the underlying surface or will have a softer ground force response. In yet another embodiment, lower pressures may indicate a stiffer ground force response of the actuators 1008, 1016 when the corresponding arm assembly 1002, 1004 experiences a ground force input.

Similarly, when the sensor 1012, 1020 are position sensors, the values communicated to the controller 906 may indicate the position of the corresponding arm assembly 1002, 1004 relative to the center frame 140. In other words, the sensors 1012, 1020 may be utilized by the controller 906 to identify the orientation of the arm assemblies 1002, 1004 relative to the center frame 140. In this embodiment, both the height of the center frame 140 and the orientation of the arm assemblies 1002, 1004 may are monitored by the controller 906 to identify the cutting height of the reciprocating knife 128 among other things.

While FIG. 10 illustrates the first and second arm assemblies 1002, 1004 as being pivotally coupled to the center frame 140 via linkage assemblies 1006, 10014, in other embodiments considered herein the arm assembly 1002, 1004 may not be pivotally coupled to the center frame 140 at all. For example, in one non-exclusive embodiment the arm assemblies 1002, 1004 may be pivotally coupled to the adapter frame 300 instead to the center frame 140. Accordingly, this disclosure contemplates implementing the teachings discussed herein regardless of the particular locations with which the components 110, 140, 300, 1002, 1004 are coupled to one another.

For a harvesting header float system or suspension, the force on the ground can change based on the pitch of the machine or header. In many conventional header float systems, there is a relatively constant float force applied through the travel of the wing or attachment frame. Due to this, as the machine encounters a change in slope due to uneven terrain or varying field conditions, the underlying ground force changes. If no adjustment is made, the header may frown or raise out of a cut. Some conventional systems may provide a ramp to the float curves to counteract the change in gravity due to uneven terrain. Nevertheless, even these conventional systems often require an operator to exit the cab of the machine and manually adjust the float force through a bolt or other fastener, for example. This, of course, can negatively affect productivity and is inefficient.

As described above, a harvesting header may be provided with a first attachment frame (or first frame assembly) which is configured to be connected to a feederhouse or adapter of a combine or other machine. The header may also include a center frame section 140, a left frame section 138 and a right frame section 142. In the aforementioned embodiments, one or more actuators may be provided to adjust a float or suspension force between the first attachment frame and the center frame section 140. A four-bar linkage as described above may be connected between the attachment frame and center frame section 140. In one example, the actuators may be hydraulic actuators, and these actuators may be adjustably controlled to adjust the float or suspension force of the suspension based on changes in terrain and field conditions. This is described further below.

Figure 11:
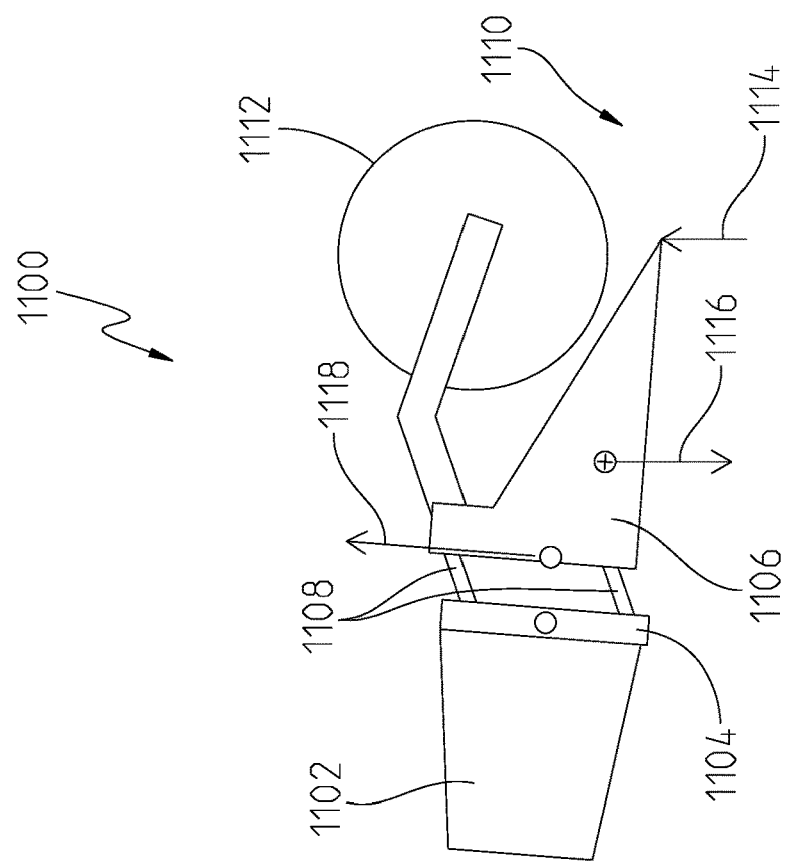
FIG. 11 is a schematic of a harvesting header traversing a field along level terrain.

In FIG. 11, for example, a schematic of a harvesting header 1100 is shown. The header 1100 may be coupled to a feederhouse 1102 of a combine. The header 1100 may further include a first attachment frame or frame assembly 1104 which is coupled to the feederhouse 1102 or an adapter, as described above. The header 1102 may also include a second frame assembly 1106. For purposes of this embodiment, the second frame assembly 1106 may include the center frame section 140, left frame section 138, and right frame section 142 of the aforementioned embodiments, although in other embodiments the second frame assembly 1106 may include a single frame section or a plurality of frame sections.

A linkage assembly 1108 may be coupled between the first and second frame assemblies. In one example, the linkage assembly 1108 may be a four-bar linkage as described above. The linkage assembly 1108, however, may take other forms of linkages. In a simple manner, the linkage assembly 1108 represents a coupling mechanism for coupling the second frame assembly 1106 to the first frame assembly 1104. The linkage system 1108 may also represent a suspension system whereby the second frame assembly 1106 is suspended from the first frame assembly 1104.

In addition, a reel 1112 may be located at a forward end of the harvesting header 1100, as shown.

The harvesting header 1100 may move in a forward travel direction, which in FIG. 11 is to the right. As it does, the header 1100 traverses along a field above an underlying ground surface 1110. In FIG. 11, the ground surface 1110 is shown being substantially level.

The ground surface 1110 may apply an upward ground force 1114 against a forward end of the header 1100 as shown. A weight and gravity force vector 1116 is directed in an opposite direction in FIG. 11 to the ground force 1114. Lastly, a float force 1118 may be applied by the suspension system to maintain the header 1100 at a desired location relative to the ground surface 1110. The suspension system, or float system, may include one or more actuators. In the embodiments described above, the one or more actuators are described as hydraulic actuators. However, for purposes of this embodiment, the one or more actuators may include any adjustment mechanism capable of controlling the position of the second frame assembly 1106 relative to the first frame assembly 1104 and the ground surface 1110.

Figure 12:
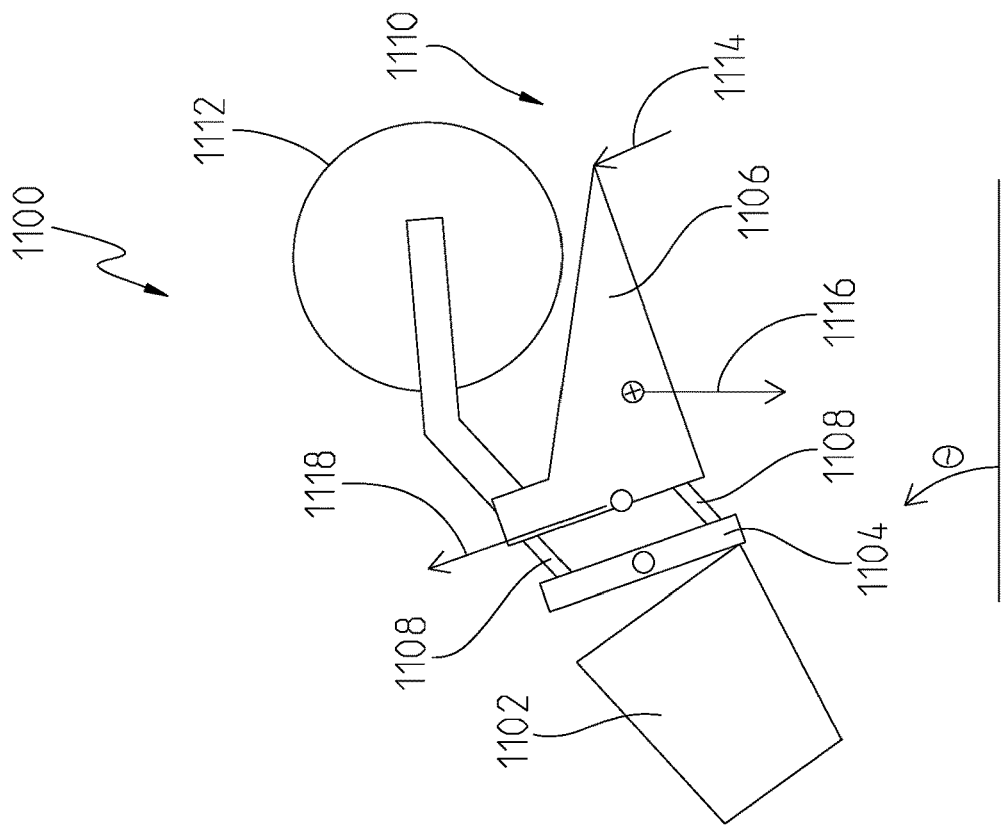
FIG. 12 is a schematic of the harvesting header of FIG. 11 traversing a field along sloped terrain.

Referring now to FIG. 12, the harvesting header 1100 is shown travelling uphill along uneven terrain. The ground surface 1110 in FIG. 12 is now disposed at an angle $\theta$ relative to the ground surface 1110 in FIG. 11. As the header 1100 travels uphill in FIG. 12, the force vector due to the weight of the header and gravity is different from that of FIG. 11. As a result, the amount of ground force applied to the header changes. In view of this, the amount of float force needed for suspending the second frame assembly 1106 relative to the first frame assembly 1104 may be different. With the forward tip of the header 1100 contacting the ground, it is further desirable to maintain the amount of weight of the header on the ground to be as consistent as possible regardless of the slope of the terrain. To do so, the float force may be adjusted depending upon the slope of the terrain or pitch of the machine.

Stated another way, when the header encounters uphill or downhill terrain, the gravity vector changes direction as shown in FIG. 12 compared to FIG. 11. Thus, to counter this, the magnitude of the float or suspension force 1118 needs to also change to properly balance the header 1100. In a hydraulic suspension system, this may include using the terrain slope to set a pressure difference in the suspension system.

Figure 13:
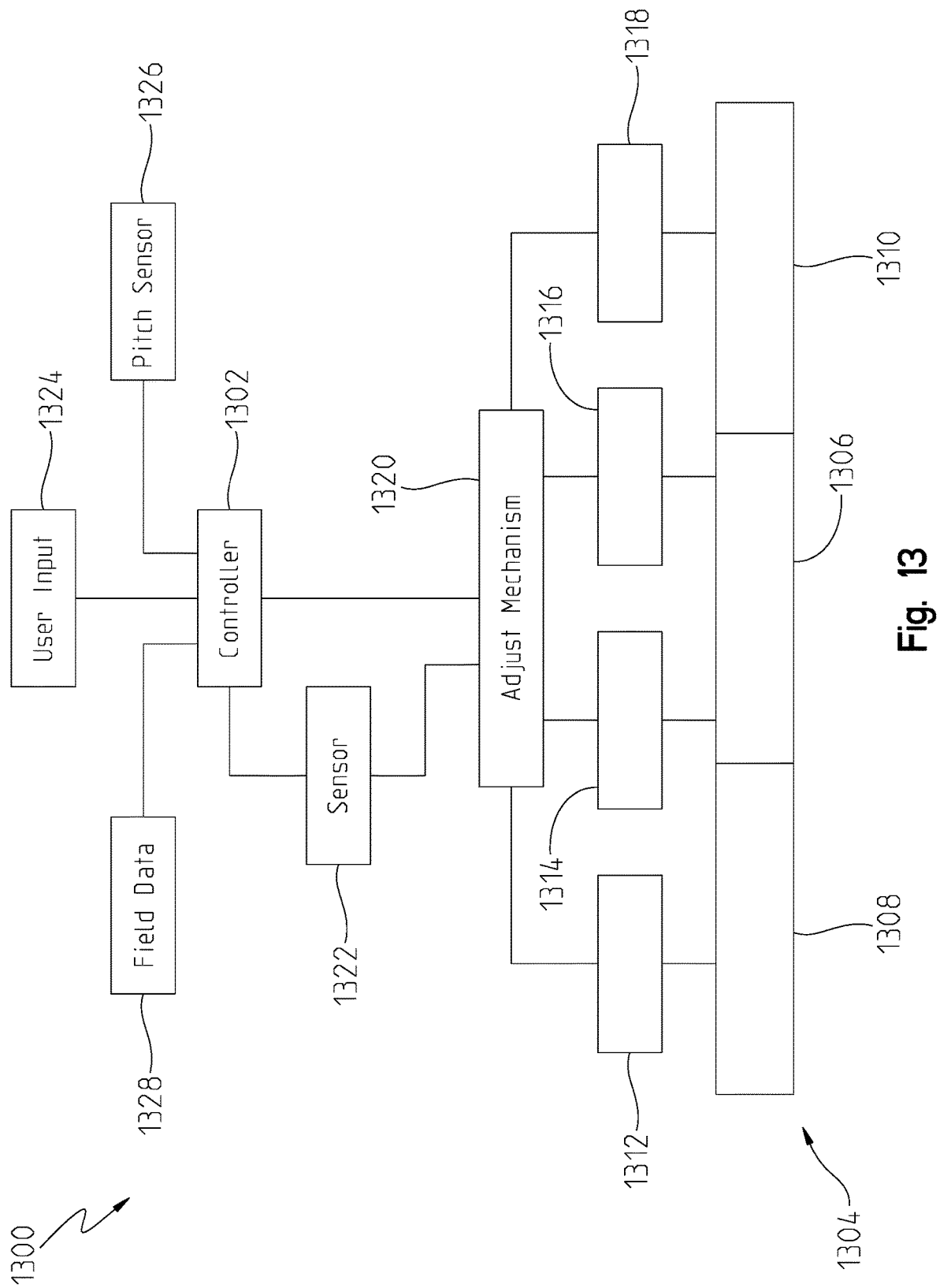
FIG. 13 is a schematic of a control system for controlling a header suspension system.

Referring to FIG. 13, an embodiment of a control system 1300 is shown. The control system 1300 may be used to monitor the slope of the terrain or pitch of the machine and adjust the suspension system to accommodate uneven terrain or changing field conditions. The control system 1300 may include a controller 1302 for controlling the suspension system. The controller 1302 may be a controller for controlling functions on the machine (e.g., the combine), a harvesting header 1304, or a combination thereof. The controller 1302 may include a plurality of inputs for receiving signals and the like. For example, the controller 1302 may be configured to receive input commands from an operator via a user input 1324. The user input 1324 may include one or more controls that communicates how the operator desires to operate the machine. It may also include the operator communicating the field conditions to the controller 1324. For instance, the operator may select from a plurality of options on a display in a cab of the machine to set the field conditions. Field conditions may range from wet and muddy to dry and firm, and anything therebetween. Additional options and settings may also be input to the controller 1302 via the user input 1324.

The harvesting header 1304 may be similar to the aforementioned embodiments such that it includes a frame assembly including a center frame section 1306, a first wing frame section 1308 and a second wing frame section 1310. Each wing frame section is located on an opposite side of the center frame section 1306. Moreover, the frame assembly is capable of floating relative to the underlying ground surface as the slope of the terrain changes. A suspension system may be coupled between the frame assembly and the machine to allow each frame section to pivot up and down as the header encounters changes in the terrain slope.

The suspension system may include a plurality of independently controlled suspension systems. In FIG. 13, a plurality of suspension systems include a first suspension system 1312, a second suspension system 1314, a third suspension system 1316, and a fourth suspension system 1318. The first suspension system 1312 may be operably coupled to the first wing frame section 1308 and the fourth suspension system 1318 may be operably coupled to the second wing frame section 1310. The second suspension system 1314 and third suspension system 1316 may be operably coupled to the center frame section 1306.

In one example of this embodiment, each suspension system is operably adjusted via hydraulic pressure. For example, one or more hydraulic actuators may be used to operably adjust each suspension system in response to a change in terrain slope. In this example, a hydraulic pressure may operably control each suspension system. As the pressure changes in one suspension system, the controller 1302 may include control logic to operably adjust the pressure in the other systems to maintain each suspension system in relation to one another.

For sake of this embodiment, the control system 1300 will be described as an electrohydraulic control system. But, as will be described below, the control system 1300 may be something other than hydraulic. Instead, an adjustment mechanism 1320 may be operably controlled by the controller 1302 to make adjustments to each suspension system as the terrain slope varies. The adjustment mechanism 1320 can be one or more hydraulic actuators used to control float pressure in each suspension system. Alternatively, the adjustment mechanism 1320 may be one or more electric or mechanical actuators. In any event, the controller 1302 may include control logic for operably controlling the adjustment mechanism 1320 to adjust each suspension system.

The control system 1300 may include a sensor 1322 for providing feedback to the controller 1302 during machine operation. The sensor 1322 may provide feedback regarding a condition related to the adjustment mechanism 1320 or the suspension system. In one example, the sensor 1322 may include a pressure sensor. In a hydraulic system, the sensor 1322 may detect an actual or real-time float pressure being applied to the suspension system. Alternatively, the sensor 1322 may be a position sensor capable of detecting a position of the adjustment mechanism 1320, the linkage system (e.g., four-bar linkage), the position of the header relative to the ground surface, etc. The sensor 1322 may be any type of sensor capable of providing feedback to the controller 1302, where the feedback is relative to the adjustment mechanism, suspension system, or the header. As such, the sensor 1322 is in electrical communication with the controller 1302 as shown in FIG. 13.

In order to adjust for changes in terrain slope, the control system 1300 may include a second sensor 1326 for detecting pitch of the machine or header or terrain slope. The sensor 1326 may be mounted to the harvesting header 1304 or the combine (not shown). The sensor 1326 may include one or more sensors for detecting changes in pitch angle or terrain slope. For example, one sensor may be located on each frame section. There may also be a sensor 1326 located on the combine as well. The sensor 1326 is capable of detecting changes in machine pitch due to uneven terrain across the width of the header 1304.

Other sensors or sensing technology may be used in other embodiments. For example, the sensor 1326 may include a camera or Light Detection and Ranging (LIDAR) sensor mounted at a front end of the header. The camera may provide visual feedback to the operator in the cab, whereas the LIDAR sensor may be capable of detecting the topography of the field and communicating the same to the controller 1302. The LIDAR sensor, for example, may be capable of mapping the topography across the width of the header.

In a further embodiment, field data including predefined topography or terrain maps may be available to the controller 1302. In one example, the controller 1302 may be capable of accessing publicly available terrain maps 1328 using cloud-based data. Alternatively, pre-recorded terrain maps may be stored in a memory unit of the controller 1302 such that the controller 1302 is able to access the terrain map prior or during operation. The benefit of using terrain maps is being able to proactively adjust the suspension system in anticipation of changes in the terrain. Hydraulic pressure in the suspension system can be increased or decreased by the controller 1302 based on the change in slope of the terrain.

As the controller 1302 receives the upcoming slope from field data 1328 or sensor 1326, the controller 1302 is able to adjust the adjustment mechanism appropriately to properly balance the header. For example, the controller 1302 may include control logic which determines a target pressure at which the suspension system needs to be at based on the slope of the terrain. As the header traverses the field and travels uphill or downhill, the control logic may indicate to the controller 1302 that the target pressure needs to increase or decrease by a given percentage or amount. The percentage or amount of change may be provided in a look-up table, diagram, chart, or other known format. Moreover, the controller 1302 may compare the target pressure to the actual pressure detected by the sensor 1322. If there is a difference between target pressure and actual pressure or the difference exceeds a threshold amount, then the controller 1302 may operably adjust the adjustment mechanism 1320. As described above, the adjustment mechanism 1320 may be a hydraulic actuator, and the controller 1302 may command an increase or decrease in pressure to the actuator in response to the change in terrain slope. In other words, as the slope changes, there may be a target pressure to maintain the suspension system at to properly balance the header.

Regarding the target pressure, the control system 1300 may be setup to achieve a consistent amount of force by the header on the ground regardless of terrain or pitch of the machine. The ground force may change based on conditions. For example, the control system may want light ground contact when the field is wet or muddy, whereas it may be desirable for heavier contact with the ground when the field is dry to allow the header to better follow the ground surface.

Figure 14:
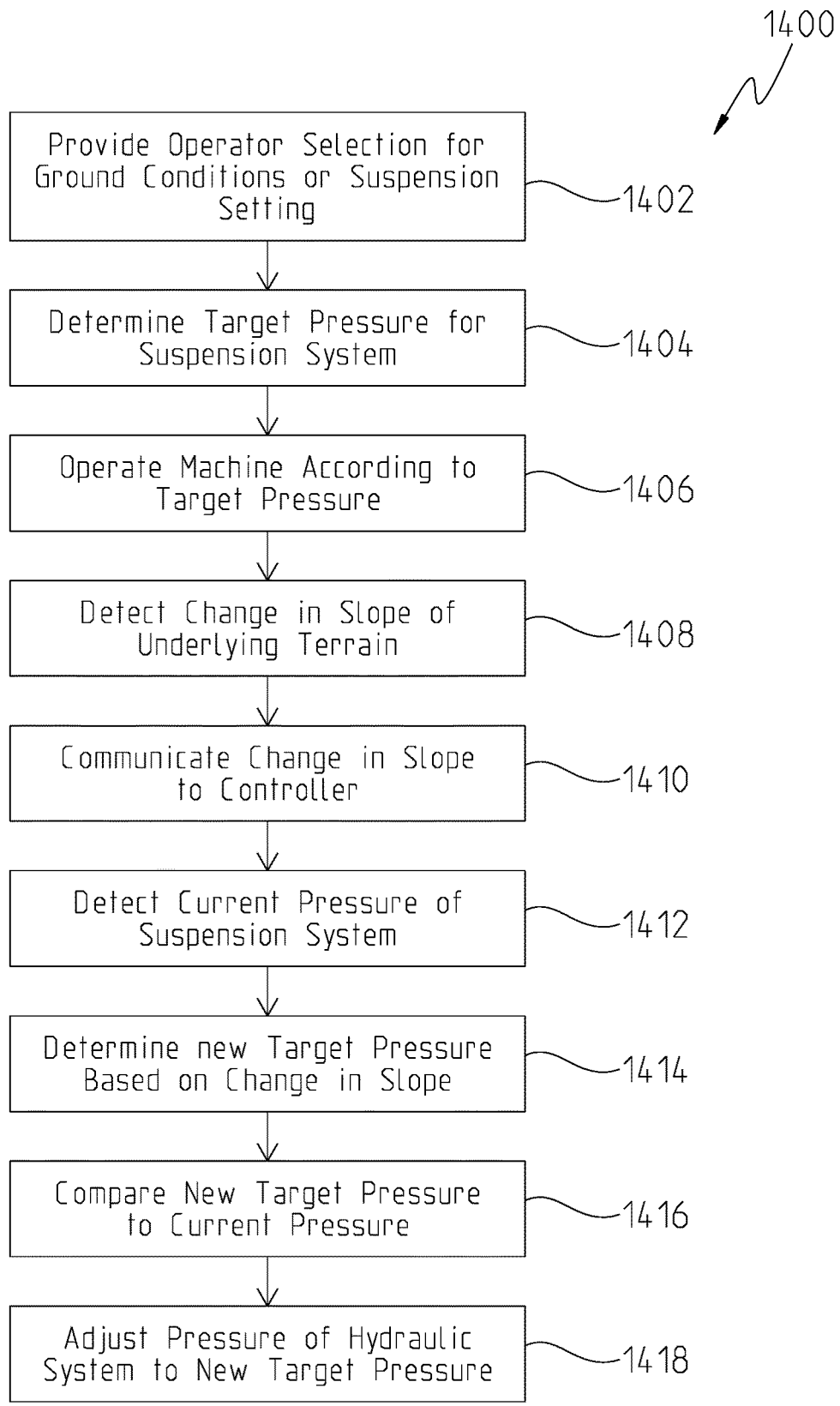
FIG. 14 is a flow diagram of a method for controlling a header suspension system.

An example of the control logic that the controller 1302 may follow is provided in FIG. 14. In FIG. 14, a control method 1400 is illustrated which is executable by the control system 1300 of FIG. 13. The control method 1400 may include a plurality of blocks or steps which are executable by the controller 1302. These plurality of blocks or steps in FIG. 14 may be executed in a different order than what is shown. Moreover, in other embodiments, it is possible there may be additional or fewer blocks or steps to be executed by the controller 1302.

In a first block 1402, the controller 1302 may receive a command from the operator indicative of a ground condition or suspension setting. For example, the operator may signal to the controller that the ground is wet, dry, muddy, etc. These different field conditions may be selectable on a display in the cab of the machine, for example. The operator may also be able to communicate a desired hydraulic pressure value for one or more of the hydraulic actuators (e.g., the adjustment mechanism 1320).

Once the controller 1302 receives inputs from the operator, the control method 1400 may advance to block 1404 where a target pressure may be determined for the suspension system. Here, the controller 1302 may determine the target pressure from a look-up table, graph, chart, or the like based on the inputs provided by the operator. As described above, if the operator indicates that the field is dry and firm, the controller 1302 may determine that a higher target pressure is desired. If the field is determined to be wet and muddy, the controller 1302 may determine that a lesser target pressure is desired. Once the target pressure is determined in block 1404, the controller 1302 may operably control the adjustment mechanism 1320 to the target pressure in block 1406. This target pressure may be established as the optimum suspension setting for a given field condition, for example.

As the machine traverses the field, the header 1304 may encounter changes in terrain slope. The changes in terrain slope may be detected by the pitch or angle sensor 1326 and communicated to the controller 1302 in block 1408. The sensor 1326 may communicate that the header is travelling uphill or downhill. In another example, the sensor 1326 may communicate that the first wing frame section 1308 is going uphill, whereas the second wing frame section 1310 is going downhill. In any event, the controller 1302 may receive changes in machine pitch or terrain slope from the second sensor 1326 in block 1410.

Alternatively, in block 1408, the controller 1302 may anticipate a change in terrain slope based on a topography map in the field data 1328. In this event, the controller 1302 is able to detect the change in machine pitch or terrain slope before the header 1304 actually reaches the location of the changing terrain.

In block 1412, a current pressure in the suspension system may be detected by the first sensor 1322. The current pressure may be an overall float pressure or an individual pressure for each suspension system. In either case, the pressure may be communicated to the controller 1302.

With the change in pitch angle or slope terrain known, the controller 1302 may determine a new target pressure for the suspension system based on the pitch angle or slope in block 1414. The new target pressure may be provided to the controller 1302 in the form of a look-up table, chart, graph, or otherwise in the control logic in another form. Once the controller 1302 determines the new target pressure in block 1414, the method 1400 can advance to block 1416 where the controller 1302 compares the new target pressure to the current pressure. From this comparison, the controller 1302 may command a change in pressure to the hydraulic actuator(s) in block 1418 to achieve the new target pressure. This new target pressure may therefore achieve a new float force applied to the suspension system in response to the change in pitch angle or terrain slope.

The method 1400 of FIG. 14 may be executed to adjust the float force on the suspension system of either wing frame section or the center frame section, or a combination thereof. The float force may be adjusted differently for each given frame section based on the terrain slope that the given frame section is traversing.

The controller 1302 may be in communication with a control valve (not shown) to adjust the amount of hydraulic pressure supplied to the hydraulic actuator. The fluid may be provided from a reservoir to the control valve, and then from the control valve to the actuator.

In another embodiment, the control system may operably increase pressure when travelling downhill and decrease pressure when travelling uphill. The control system may be hydraulic, but this is not necessary in every embodiment. For example, a mechanical coil spring with an electric actuator may be used in place of the hydraulic system described above. The electric actuator may be controlled by the controller to turn a screw for compressing the spring. As this is done, adjustments to the suspension system may be made in response to changes in machine pitch or terrain slope.

In the present disclosure, embodiments are provided for automatically adjusting a suspension system of a harvesting header rather than requiring an operator to manually adjust a conventional suspension system. The harvesting header may include an adapter frame mounted to a feederhouse of a work machine such as a combine, and a second frame assembly suspended from the adapter frame via a suspension system.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A harvesting header for traversing a field to perform a harvesting operation, comprising:
   a first frame assembly adapted to be coupled to a work machine;
   a second frame assembly suspended forward of the first frame assembly, the second frame assembly configured to pivot relative to the first frame assembly;
   a suspension system coupled to the second frame assembly, the suspension system providing a suspension force to the second frame assembly, the suspension force having a spring-like response;
   a controller operably coupled to the suspension system; and
   a slope detection system disposed in electrical communication with the controller, the slope detection system communicating a slope of the field to the controller during the harvesting operation, the slope of the field comprising uphill or downhill orientation of the harvesting header;
   wherein, the controller operably controls the suspension system by adjusting the suspension force based on the slope of the field.

2. The harvesting header of claim 1, wherein the slope detection system comprises a sensor for detecting a pitch of the machine or slope of the field, the sensor being coupled to the first frame assembly, the second frame assembly or the machine.

3. The harvesting header of claim 1, wherein the slope detection system comprises a predefined topography map indicating the slope at any given location in the field.

4. The harvesting header of claim 1, wherein the suspension system comprises an adjustment mechanism operably controlled by the controller to adjust the suspension force.

5. The harvesting header of claim 4, wherein the adjustment mechanism comprises at least one hydraulic actuator, the controller controlling an amount of pressure to the at least one actuator to operably adjust the suspension force.

6. The harvesting header of claim 5, further comprising a second sensor in electrical communication with the controller, the second sensor configured to detect an actual hydraulic pressure of the at least one actuator;
wherein, the controller operably adjusts the actual hydraulic pressure to a target hydraulic pressure in response to a change in slope or machine pitch.

7. A harvesting header for performing a harvesting operation in a field, comprising:
a first frame assembly adapted to be coupled to a feederhouse of a work machine;
a second frame assembly suspended forward of the first frame assembly, the second frame assembly comprising a center frame, a first wing frame and a second wing frame;
a suspension system coupled to the second frame assembly;
an actuator of the suspension system providing a suspension force to the second frame assembly;
a controller operably coupled to the actuator to adjust the suspension force; and
a plurality of sensors disposed in electrical communication with the controller, the plurality of sensors including at least a first sensor for detecting a slope of the field, including uphill or downhill orientation of the harvesting header, and a second sensor for detecting a current pressure of the actuator during the harvesting operation;
wherein, the controller operably controls the pressure of the actuator to adjust the suspension force based on the slope of the field.

8. The harvesting header of claim 7, wherein the suspension system comprises a plurality of suspension systems independently controlled by the controller based on the slope of the field, the plurality of suspension systems including a first suspension system coupled to the center frame, a second suspension system coupled to the center frame, a third suspension system coupled to the first wing frame, and a fourth suspension system coupled to the second wing frame.

9. The harvesting header of claim 8, wherein the actuator comprises a plurality of actuators for controlling the suspension force of each suspension system, the controller determining a target pressure for each of the plurality of suspension systems based on the slope of the field and operably controls the plurality of actuators to adjust the suspension force of each of the plurality of suspension systems based on the respective target pressure.

10. The harvesting header of claim 7, further comprising a control system including a user interface in communication with the controller, the controller configured to receive an instruction from the user interface indicative of a current field condition;
wherein, the controller operably commands a target pressure to the actuator in response to the current field condition and the slope of the field detected by the first sensor.

11. The harvesting header of claim 7, further comprising a control system including a user interface in communication with the controller, the controller configured to receive an instruction from the user interface indicative of an optimum suspension force;
wherein, the controller operably sends a pressure command to the actuator to achieve the optimum suspension force;
further wherein, the controller operably communicates a target pressure to the actuator to adjust the optimum suspension force in response to a change in slope of the field.

12. The harvesting header of claim 7, further comprising control logic executable by the controller to determine a target pressure based on a given slope of the field.

13. A method for controlling a suspension system of a harvesting header, the harvesting header coupled to a work machine for performing a harvesting operation in a field, the method comprising:
providing a first frame assembly, a second frame assembly suspended forward of the first frame assembly, the suspension system coupled to and providing a suspension force to the second frame assembly, a controller, an actuator, and a slope detection system;
sending a first hydraulic pressure to the actuator to provide a suspension force to the second frame assembly;
detecting a change in slope of the field with the slope detection system, the change in slope including a change in uphill or downhill orientation of the harvesting header;
communicating the change in slope to the controller from the slope detection system;
determining a target pressure by the controller as a function of the change in slope; and
commanding target pressure to the actuator by the controller to adjust the suspension force in response to the change in slope, wherein the target pressure is different from the first hydraulic pressure.

14. The method of claim 13, wherein the detecting step comprises receiving the slope of the field from a topography map.

15. The method of claim 14, wherein the target pressure is greater than the first hydraulic pressure when the slope detection system detects a downhill slope, and the target pressure is less than the first hydraulic pressure when the slope detection system detects an uphill slope.

16. The method of claim 13, further comprising:
receiving a command from a user input indicative of a desired suspension force of the suspension system at a level ground surface;
determining the first hydraulic pressure as a function of the desired suspension force; and
controlling a control valve by the controller to send the first hydraulic pressure to the actuator.

17. The method of claim 16, further comprising:
detecting a current hydraulic pressure of the actuator by a sensor;
communicating the current hydraulic pressure by the sensor to the controller;

comparing the target pressure to the current hydraulic pressure; and performing the commanding step if a difference between the target pressure and the current hydraulic pressure exceeds a threshold amount.

18. The method of claim 13, further comprising:

receiving a command from a user input indicative of a current field condition;

determining the first hydraulic pressure as a function of the current field condition; and controlling a control valve by the controller to send the first hydraulic pressure to the actuator.

19. The method of claim 13, further comprising:

providing the second frame assembly with a center frame, a first wing frame and a second wing frame;

providing the suspension system with a first suspension system coupled to the center frame, a second suspension system coupled to the center frame, a third suspension system coupled to the first wing frame, and a fourth suspension system coupled to the second wing frame; and controlling the suspension force of each of the first suspension system, the second suspension system, the third suspension system, and the fourth suspension system independently of one another by the controller based on the change in slope of the field.

* * * * *